(12) United States Patent
Matsuzawa et al.

(10) Patent No.: US 9,584,708 B2
(45) Date of Patent: Feb. 28, 2017

(54) OPTICAL SYSTEM AND LENS CONTROL SYSTEM HAVING FOCUS ADJUSTMENT USED FOR IMAGING APPARATUS

(71) Applicant: OLYMPUS CORPORATION, Hachioji-shi, Tokyo (JP)

(72) Inventors: Yoshinori Matsuzawa, Hachioji (JP); Sumio Kawai, Hachioji (JP); Toru Miyajima, Hachioji (JP); Osamu Nonaka, Sagamihara (JP); Hiroshi Kodama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/710,245

(22) Filed: May 12, 2015

(65) Prior Publication Data

US 2015/0244907 A1 Aug. 27, 2015

Related U.S. Application Data

(62) Division of application No. 13/309,065, filed on Dec. 1, 2011, now Pat. No. 9,041,852.

(30) Foreign Application Priority Data

Dec. 10, 2010 (JP) .................................. 2010-276339
Dec. 13, 2010 (JP) .................................. 2010-277539

(51) Int. Cl.
*H04N 5/225* (2006.01)
*G02B 15/14* (2006.01)

(52) U.S. Cl.
CPC ........... *H04N 5/2254* (2013.01); *G02B 15/14* (2013.01)

(58) Field of Classification Search
CPC .. H04N 5/2254; H04N 5/23212; H04N 5/232; G02B 15/14
See application file for complete search history.

(56) References Cited

U.S. PATENT DOCUMENTS

| 4,210,387 A | * | 7/1980 | Ogawa | G02B 15/00 359/699 |
| 4,786,153 A | | 11/1988 | Ogata | |
| 7,355,646 B2 | * | 4/2008 | Wakazono | G02B 7/102 348/345 |
| 7,379,249 B2 | * | 5/2008 | Ohashi | G02B 15/173 359/684 |
| 7,418,199 B2 | * | 8/2008 | Kawamura | G03B 17/00 348/240.3 |

(Continued)

FOREIGN PATENT DOCUMENTS

| JP | 62-195617 | 8/1987 |
| JP | 11-183782 | 7/1999 |

(Continued)

*Primary Examiner* — Nicholas Giles
(74) *Attorney, Agent, or Firm* — Volpe and Koenig, P.C.

(57) ABSTRACT

An imaging apparatus comprises an optical system that includes a plurality of lens groups, each lens group including one or more lenses, at least one of the lens groups being independently movable with respect to the other lens groups and including a focus lens group for focusing the subject and a lens control unit that controls movement of the plurality of lens groups to bring into focus based on a feeding position of the focus lens group.

22 Claims, 16 Drawing Sheets

(56) References Cited

U.S. PATENT DOCUMENTS

| | | | |
|---|---|---|---|
| 7,679,835 B2* | 3/2010 | Ohashi | G02B 15/173 359/684 |
| 7,855,842 B2* | 12/2010 | Ohashi | G02B 15/173 359/686 |
| 7,961,245 B2* | 6/2011 | Hirai | G02B 7/102 348/229.1 |
| 2003/0058548 A1* | 3/2003 | Itoh | G02B 15/177 359/686 |
| 2004/0189858 A1* | 9/2004 | Wakazono | G02B 7/102 348/347 |
| 2005/0030405 A1* | 2/2005 | Morooka | H04N 5/2254 348/335 |
| 2005/0231599 A1* | 10/2005 | Yamasaki | G02B 3/14 348/207.99 |
| 2005/0270663 A1* | 12/2005 | Ohashi | G02B 15/173 359/685 |
| 2006/0158546 A1* | 7/2006 | Hirai | G02B 7/102 348/335 |
| 2007/0230934 A1* | 10/2007 | Nakamura | G02B 7/08 396/111 |
| 2008/0204894 A1* | 8/2008 | Ohashi | G02B 15/173 359/685 |
| 2009/0324207 A1* | 12/2009 | Hatakeyama | G02B 15/173 396/55 |
| 2010/0091381 A1* | 4/2010 | Katakura | G02B 13/001 359/676 |
| 2013/0027605 A1* | 1/2013 | Yoshitsugu | G02B 27/646 348/345 |

FOREIGN PATENT DOCUMENTS

| | | |
|---|---|---|
| JP | 2000-292700 | 10/2000 |
| JP | 2010-204282 | 9/2010 |

* cited by examiner

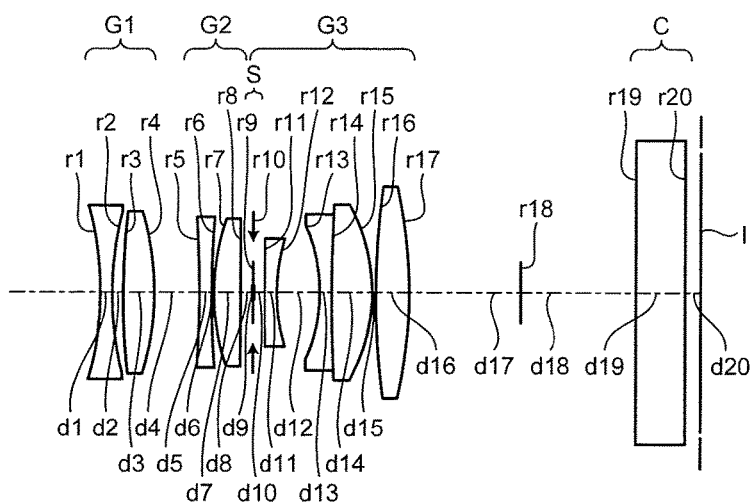
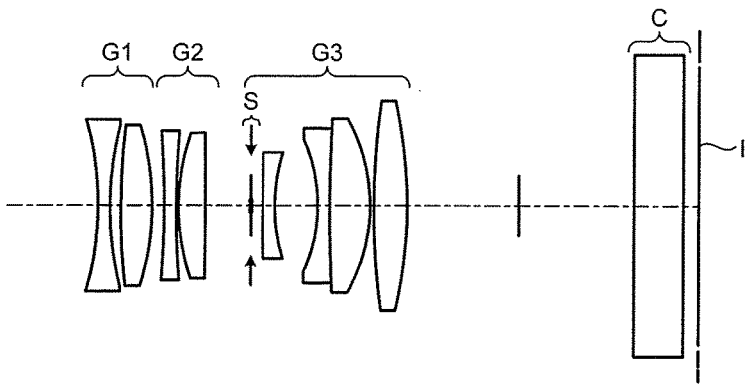
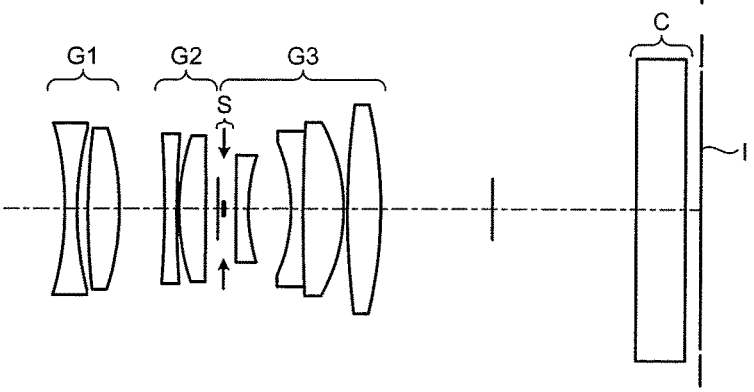
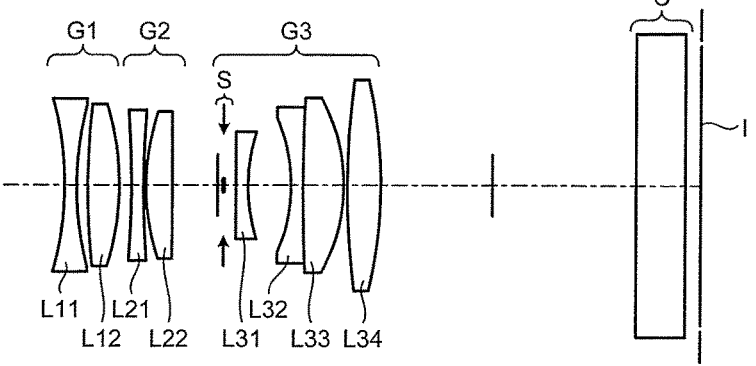

OPTICAL SYSTEM AND LENS CONTROL SYSTEM HAVING FOCUS ADJUSTMENT USED FOR IMAGING APPARATUS

CROSS REFERENCE TO RELATED APPLICATIONS

This application is a division of U.S. patent application Ser. No. 13/309,065, filed Dec. 1, 2011, which claims the benefit of priority from Japanese Patent Application No. 2010-277539 filed on Dec. 13, 2010 and No. 2010-276339 filed on Dec. 10, 2010; the entire contents of which are incorporated herein by reference.

FIELD OF INVENTION

The present invention relates to an imaging apparatus for capturing a subject and generating image data of the subject and an optical system used for the imaging apparatus.

BACKGROUND

Techniques are known for enabling macro photography for an imaging apparatus that captures a subject and generates electronic image data of the subject by inserting a relay optical system as an optical system. Such techniques are described in, for example, Japanese Unexamined Patent Application Publication No. H11-183782.

SUMMARY

An imaging apparatus according to an aspect of the present invention for capturing an image of a subject to generate electronic image data comprises an optical system that includes a plurality of lens groups, each lens group including one or more lenses, at least one of the lens groups being independently movable with respect to the other lens groups and including a focus lens group for focusing the subject and a lens control unit that controls movement of the plurality of lens groups to bring into focus based on a feeding position of the focus lens group.

The optical system according to an aspect of the present invention has at least a first mode that focuses on a first close object from an infinite object and a second mode that focuses on a third close object from a second close object, the second close object being closer to the imaging apparatus than the infinite object, the third close object being closer to the imaging apparatus than the first close object. The optical system comprises a focus lens group that is made up of one or two lenses and moves in an optical axis direction in focusing in each of the first mode and the second mode and one or more mode change lens groups that move in the optical axis direction separately from the focus lens groups when the focusing is changed from the first mode to the second mode, wherein the following conditional expression (1) is satisfied:

$$6 < dB/dA < 50 \tag{1}$$

where dA is a distance on the optical axis between an incoming plane and an outgoing plane of the focus lens group, and dB is a distance on the optical axis between an incoming plane closest to an object side among incoming planes of all lens groups that move when the focusing is changed from the first mode to the second mode and an outgoing plane closest to an image side among outgoing planes of the all lens groups, dB being a maximum distance if the distance is variable.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a diagram showing a cross-sectional configuration of an optical system of the lens unit in an infinite-distance focusing state when an optical system is set in a first mode.

FIG. 5B is a diagram showing a cross-sectional configuration of the optical system in a short distance state when the optical system is set in the first mode.

FIG. 5C is a diagram showing a cross-sectional configuration of the optical system in a longest-distance focusing state when the optical system is set in a second mode.

FIG. 5D is a diagram showing a cross-sectional configuration of the optical system in a short distance state when the optical system is set in the second mode.

DETAILED DESCRIPTION OF THE PREFERRED EMBODIMENTS

Figure 1:
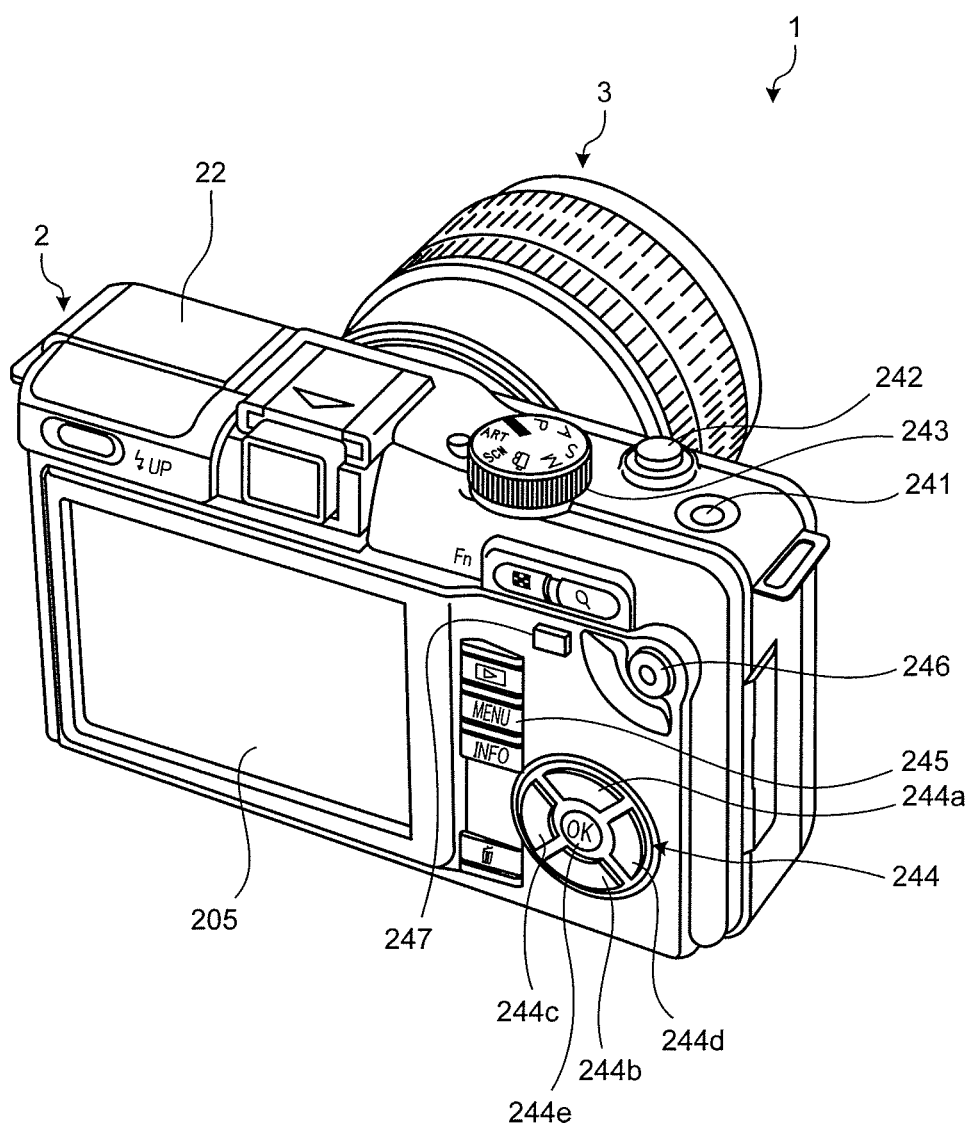
FIG. 1 is a perspective view showing a configuration of a side facing a photographer (rear side) of an imaging apparatus according to an aspect of the present invention.

Referring to the drawings, preferred embodiments according to the invention will be described below.

Figure 2:
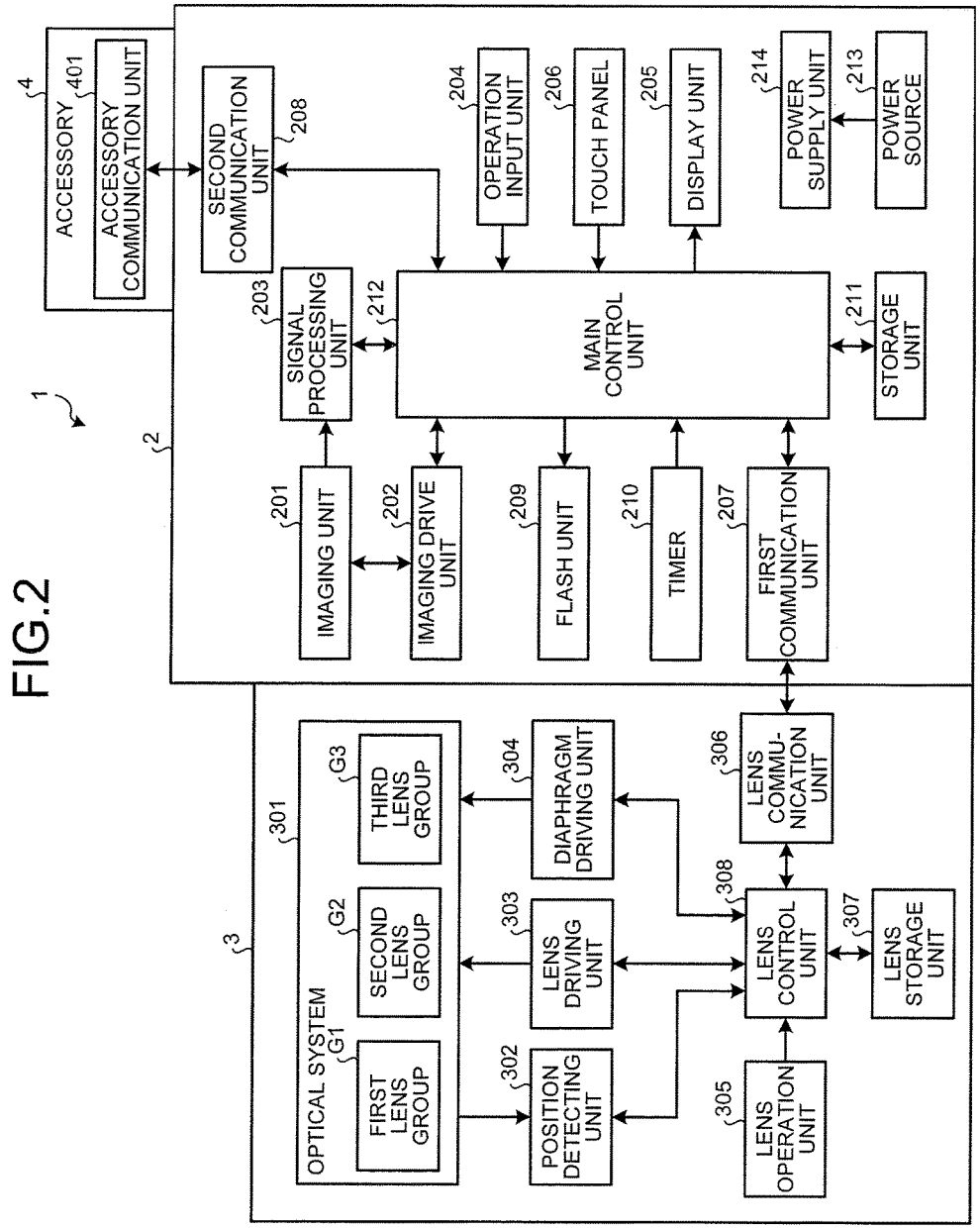
FIG. 2 is a block diagram showing a configuration of the imaging apparatus.

FIG. 1 is a perspective view showing a preferred configuration of a side facing a photographer of an imaging apparatus (rear side) according to the invention. FIG. 2 is a block diagram showing a preferred configuration of the imaging apparatus. The imaging apparatus 1 shown in FIGS. 1 and 2 is a single-lens reflex digital camera provided with a main body 2 and a lens unit 3 that is detachably attached to the main body 2.

As shown in FIGS. 1 and 2, the main body 2 has an imaging unit 201, an imaging drive unit 202, a signal processing unit 203, an operation input unit 204, a display unit 205, a touch panel 206, a first communication unit 207, a second communication unit 208, a flash unit 209, a timer 210, a storage unit 211, a main control unit 212, a power source 213 and a power supply unit 214.

The imaging unit 201 has an image pickup device such as a CCD (Charge Coupled Device) for receiving light collected by the lens unit 3 and converting the light into electrical signals and a shutter.

The imaging drive unit 202 drives the image pickup device and the shutter based on a release signal.

The signal processing unit 203 performs signal processing such as amplification for an analogue signal output from the imaging unit 201 and then performs A/D conversion to generate and output digital image data.

As shown in FIG. 1, the operation input unit 204 has a power switch 241, a release switch 242, a shooting mode switch 243, an operation switch 244, a menu switch 245, a moving image switch 246 and a mode switch 247.

The power switch 241 turns the imaging apparatus 1 power on and off.

The release switch 242 inputs a still image signal to give an instruction for still image shooting.

The shooting mode switch 243 gives an instruction for switching photo shooting modes set for the imaging apparatus 1.

The operation switch 244 inputs an instruction signal that gives instruction to select or determine a setting of the imaging apparatus 1. The operation switch 244 has buttons 244a, 244b, 244c and 244d that are up, down, left and right buttons, respectively, for selecting a setting in a menu screen and the like and a determination button 244e (OK button) for determining operation using the buttons 244a to 244d in the menu screen and the like. (See FIG. 1.)

The menu switch 245 inputs an instruction signal that gives an instruction to display operation menu screen set for the imaging apparatus 1.

The moving image switch 246 inputs a moving image release signal to give an instruction for moving image shooting.

It is possible to switch modes arbitrarily using the mode switch 247 between the first mode and the second mode for the optical system 301. Further, it is also possible to switch the modes manually while focusing the optical system 301 automatically. Various examples of the mode switching are given, for example, manual switching by a button operation, a lever operation, a dial operation or an electric switch as described above and auto switching by software process and the like. For example, when a photographer is performing macro-photography and a subject enters a range of a subject distance, automatic mode switching is possible. In this case, when a focus lens is moving, it is also possible to perform focusing continuously during mode switching to the second mode. Further, it is also possible to perform focusing while an entire lens is retracting in a focusing operation from a second close object point to an infinite object point. The optical system 301 includes both configurations where photographing ranges (object-image distances) of the first mode and that of the second mode overlap and do not overlap.

The display unit 205 is realized with a display panel made of liquid crystal or organic EL (Electro Luminescence). The display unit 205 displays the image data and information regarding operation of the imaging apparatus 1 and shooting, as needed.

The touch panel 206 is provided on a display screen of the display unit 205. The touch panel 206 detects a contact position by the photographer based on information displayed on the display unit 205 and receives input of an operation signal corresponding to the contact position. For touch panels, a resistor film system, an electrostatic capacitance system, an optical system and the like are generally known. However, any system for touch panels can be used without departing from the invention.

The first communication unit 207 is a communication interface for communicating with the lens unit 3 attached to the main body 2. The second communication unit 208 is a communication interface for communicating with an accessory unit 4 attached to the main body 2. The accessory unit 4 has an accessory communication unit 401 for communicating with the second communication unit 208 as a communication interface. Examples of the accessory unit 4 may include an electronic viewfinder (EVF), an electronic flash and the like.

The flash unit 209 is configured with a xenon lamp, an LED (Light Emitting Diode) and the like. The flash unit 209 flashes stroboscopic light (auxiliary light) toward a viewing area to be captured by the imaging apparatus 1.

The storage unit 211 is realized with a semiconductor memory that is fixedly provided inside the imaging apparatus 1, such as a flash memory or a DRAM (Dynamic Random Access Memory). The storage unit 211 stores the image data, information regarding the lens unit 3 attachable to the main body 2, a zoom speed depending on a type of the lens unit 3 and the like. Additionally, the storage unit 211 stores programs, parameters for executing the programs and the like. The storage unit 211 may include a computer-readable recording medium such as an external memory card.

The main control unit 212 performs image processes such as edge emphasis, color correction, γ correction for the image data, various computational processing and operation control of the main body 2. The main control unit 212 is realized with a CPU (Central Processing Unit) and the like.

The power source 213 is configured with a battery detachable from the imaging apparatus 1. The power supply unit 214 supplies electricity to each component of the imaging apparatus 1, including the detachable lens unit 3. The power supply unit 214 may supply electricity from an external power source (not shown) to each component of the imaging apparatus 1.

The main body 2 having the above-described configuration may have an audio input/output function, a communication function for communication via the Internet and the like.

The lens unit 3 comprises an optical system 301, a position detecting unit 302, a lens driving unit 303, a diaphragm driving unit 304, a lens operation unit 305, a lens communication unit 306, a lens storage unit 307 and a lens control unit 308.

The optical system 301 has a first lens group G1 having a positive refracting power, a second lens group G2 having a positive refracting power and a third lens group G3 having a positive refracting power. The second lens group G2 is a focus lens group for focusing on a subject, which is an inner focus lens. The first lens group G1 and the third lens group G3 are mode change lens groups that move separately from the focus lens group along the optical axis when lens mode is switched.

The position detecting unit 302 detects a lens position in the optical system 301 in the optical axis direction.

The lens driving unit 303 drives the lens in the optical system 301.

The diaphragm driving unit 304 drives a diaphragm in the optical system 301. The lens operation unit 305 generates a signal for operating the lens in the optical system 301 and then inputs the generated operation signal into the lens control unit 308. The lens operation unit 305 is a ring-shaped push switch, for example.

The lens communication unit 306 communicates with the first communication unit 207 in the main body 2 when attached to the main body 2.

The lens storage unit 307 stores control programs and parameters to determine a position and movement of the lens based on the instruction from the main control unit 212. The lens storage unit 307 stores information as a parameter to determine whether the inner focus lens reaches a limit region for focusing. Here, the limit region is decided by a mechanical limit of a feeding position, a feeding control accuracy of the inner focus lens and the like. The mechanical limit of the feeding position is defined by the region along the optical axis in which the driving unit 303 can drive the focus lens. When the mode is switched between a mode that moves the lens groups other than the inner focus lens and another mode that moves the entire optical system including the inner focus lens, it is possible to set the limit region arbitrarily within a range where object-image distances in the two modes overlap. The lens storage unit 307 stores information regarding the mode switching of the above-described two modes.

The lens control unit 308 controls operation of the lens unit 3 based on the operation signal from the lens operation unit 305 and the instruction signal from the main body 2. Specifically, the lens control unit 308 drives the lens driving unit 303 to bring into focus and change zoom of the lens unit 3 based on the operation signal from the lens operation unit 305 and drives the diaphragm driving unit 304 to change diaphragm values. Further, the lens control unit 308 determines whether the inner focus lens reaches the limit region for focusing. When the lens unit 3 is attached to the main body 2, the lens control unit 308 may transmit information to the main body 2 on focus position and focal distance of the lens unit 3, unique information to identify the lens unit 3 and the like. Such a lens control unit 308 is configured by a CPU and the like. The lens control unit 308 communicates with the main control unit 212 on a lens state of the lens unit 3 at a predetermined period. For this communication, a determination is made about whether the inner focus lens reaches the limit region for focusing, and the result of this determination and information regarding a mode selected from the above-described two modes are transmitted from the lens control unit 308 to the main control unit 212.

The optical system 301 will be described in detail below. Generally, a focus lens group is made up of one or two lenses. It is more preferred that the focus lens group be made up of two lenses including a negative lens and a positive lens. The focus lens group may be a single lens or a cemented lens. Further, in focusing operation in the first mode and the second mode of the optical system 301, the focus lens group moves in the optical axis direction. It is preferred that the focus lens group be made up of only one lens group and that the focus lens group be only one lens group that moves in the optical axis direction in focusing operation in the first mode and the second mode.

A configuration where the focus lens group is made up of one or two lenses and where the weight of the focus lens group is reduced advantageously contributes to increase focus speed, save power consumption and achieve silence noise during photographing. Particularly, a configuration where the focus lens group is made up of two lenses including a negative lens and a positive lens advantageously contributes to achieve size reduction and aberration correction simultaneously. Such a configuration permits optical performance required for the focus lens group at a longer focusing distance position and at a closer focusing distance position to be optimally achieved. For short distance photographing, focusing is changed from the first mode to the second mode by moving the mode change lens group to an object side. This also advantageously contributes to increase focus speed, save power consumption and achieve silence noise during photographing in a short distance photographing range, i.e. the second mode.

Preferably, the first lens group G1, the second lens group G2 and the third lens group G3 have a positive refracting power, respectively. When the focusing is changed from the first mode to the second mode, the first lens group G1, the second lens group G2 and the third lens group G3 move so that a distance between the first lens group and the third lens group is increased. This facilitates correction of spherical aberration, curvature of field and the like in the second mode.

It is preferred that one of the one or more mode change lens groups be positioned immediately before the focus lens group with respect to the subject side, and a range of movement of the focus lens group in the optical axis direction in the second mode be shifted to be closer to the subject side than in the first mode. Accordingly, the distance between the mode change lens group and the focus lens group for the first mode and the second mode can be configured in a manner not to be separated too far from each other. As a result, for a mechanism where a lens barrel holding the entire optical system is extended, for example, size reduction of the optical system when not in use is achieved.

Further, it is preferred that the lens group disposed closest to the subject side of the plurality of the lens groups constituting the optical system 301 be one of the one or more mode change lens groups. That advantageously contributes to shorten an overall length of the optical system 301 in the first mode and facilitates to make the length of the optical system 301 compact.

Further, it is preferred that both the mode change lens group and the focus lens group move toward the subject side when the focusing is changed from the first mode to the second mode. An off-axial light beam of the focus lens group can be configured in a manner to not be high by moving the focus lens group toward the object side in mode changing. This permits a reduction in a diameter of the focus lens group Referring to FIG. 2, the first lens group G1 (first mode change lens group) and the third lens group G3 (second mode change lens group) are provided as a mode change lens group. The plurality of the mode change lens groups contributes to achieve optical performance in the first mode and the second mode.

Further, a relative distance between the first lens group G1 and the third lens group G3 changes when the focusing is changed from the first mode to the second mode. Accordingly, this facilitates correction of spherical aberration, curvature of field and the like when the focusing is changed to the second mode.

Further, the focus lens group (second lens group G2) is disposed between the two mode change lens groups. Accordingly, this contributes to reduce the diameter and weight of the focus lens group and facilitates to increase auto focus speed.

Figure 3:
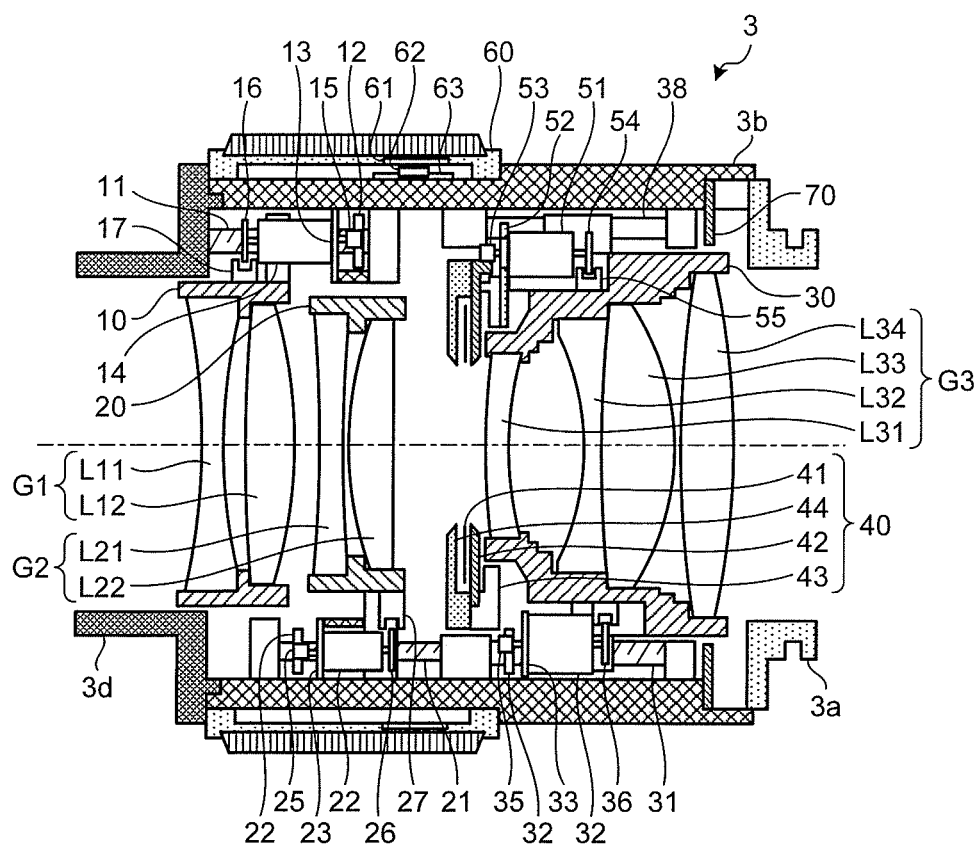
FIG. 3 is a sectional diagram showing a configuration of a principal part of a lens unit of the imaging apparatus.

FIG. 3 is a sectional view showing the configuration of the principal part in the lens unit 3. Referring to FIG. 3, a more detailed configuration of the lens unit will be described below. In FIG. 3, the subject side is shown on a left side (hereinafter referred to as "front side"), and a side to be attached to the main body 2 is shown on a right side (hereinafter referred to as "rear side"). The first lens group G1 is made up of a biconcave negative lens L11 and a biconvex positive lens L12. The second lens group G2 is made up of a biconcave negative lens L21 and a biconvex positive lens L22. The third lens group G3 is made up of a negative meniscus lens L31 facing the subject side, a cemented lens made up of a biconcave negative lens L32 and a biconvex positive lens L33 and a biconvex positive lens L34.

The lens unit 3 is an interchangeable lens. A bayonet mount 3a to be attached to the main body 2 is provided at a rear end of the lens unit 3. The mount 3a is fixed to a fixing frame 3b with screws and the like. An electrical signal terminal (not shown) is provided on the mount 3a. The electrical signal terminal is an interface to electrically connect to the main body 2.

The lens unit 3 has a first-group frame 10 for holding the first lens group G1, a second-group frame 20 for holding the second lens group G2 and a third-group frame 30 for holding the third lens group G3 and a diaphragm mechanism.

Figure 4:
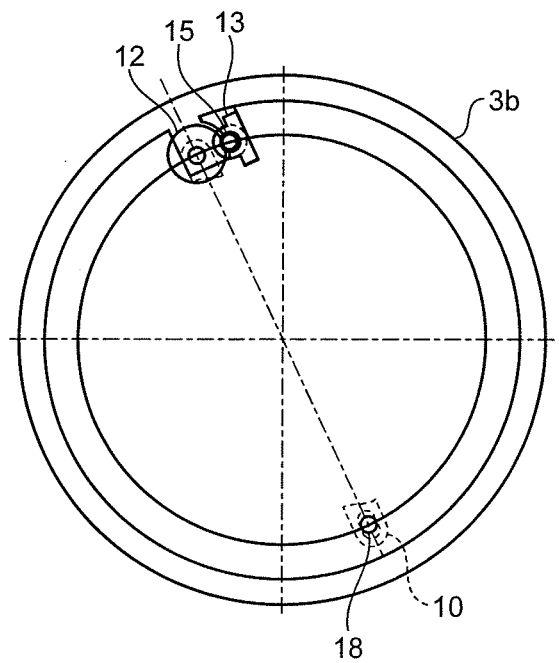
FIG. 4 is a diagram showing principal components of the lens unit from a subject side.

FIG. 4 is a diagram where the principal components are viewed from the subject side to describe a mechanism for driving the first-group frame 10. Since driving mechanisms for each frame are configured in a same manner, details of only the driving mechanism of the first-group frame 10 will be described below. In the first-group frame 10, one end of a shaft-shaped first-group lead screw 11 with threads (a screw for shifting the first lens group G1) is fitted into a hole in a protrusion on an inner peripheral side of the fixing frame 3b. Another end of the first-group lead screw 11 is fitted into a hole in a front fixing frame 3d fixed to the fixing frame 3b. The first-group lead screw 11 is held to be freely rotatable around an axis parallel to the optical axis. At a rear end of the first-group lead screw 11, a first screw gear 12 is locked by caulking, pressing and the like.

A first-group motor 14 formed integrally with a plate-like first-group motor base 13 is fixed to another protrusion on the fixing frame 3b with screws and the like. A first-group motor gear 15 is fixed to one end of a rotating shaft of the first-group motor 14 by press fitting and the like, and the first-group screw gear 12 engages with the first-group motor gear 15. A first-group position detection blade 16 where a plurality of slits is radially disposed about the rotating shaft is fixed to another end of the rotating shaft of the first-group motor 14 by press fitting and the like. A first-group position detector 17 composed of a photo interrupter is provided so that the first-group position detector 17 passes thorough an outer peripheral part of the first-group detection blade 16. The first-group motor 14, the first-group motor gear 15 and the like constitute the lens driving unit 303. The first-group position detection blade 16, the first-group detector 17 and the like constitute the position detecting unit 302.

A female screw screwing with the first-group lead screw 11 is formed on a protrusion on an outer peripheral side of the first-group frame 10. At an opposite position to the first-group lead screw 11 and the first-group screw gear 12 across the optical axis, a first-group guide shaft 18 whose both ends are fixed to the protrusion on the inner peripheral side of the fixing frame 3b is provided parallel to the optical axis (See FIG. 4).

The first-group guide shaft 18 is fitted into a long hole extending in a radial direction of the optical axis formed on the protrusion on the outer peripheral side of the first-group frame 10. The first-group guide shaft 18 is positioned and held on the fixing frame 3b by screwing the first-group lead screw 11 through a female screw.

Next, operation of the first-group frame 10 will be described. As the first-group motor 14 is rotated, the first-group screw gear 12 engaging with the first-group motor gear 15 rotates and then the first-group lead screw 11 integrally formed with the first-group screw gear 12 rotates. Hence rotational force is exerted to the first-group frame 10 engaging with the first-group lead screw 11 to rotate about the rotating shaft of the first-group lead screw 11. Since turn of the first-group frame 10 is stopped by the first-group guide shaft 18, the first-group frame 10 moves in the optical axis direction by a screw pitch in accordance with one turn of the first-group lead screw 11. A member such as a spring is appropriately provided (not shown) to prevent backlash occurring at the first-group lead screw 1 and the first-group guide shaft 18 in accordance with turn of the first-group lead screw 11. Accordingly, turn of the first-group motor 14 is properly transmitted to the first-group frame 10. With the lens unit 3 having such a configuration, turn of the motor shaft is detected by the first-group position detection blade 16 fixed to the other end of the motor shaft of the first-group motor 14 and the first-group position detector 17, and thus a position of the first-group frame 10 is accurately detected.

Since driving operation of the second-group frame 20 and the third-group frame 30 are basically the same as that of the first-group frame 10, overlapping descriptions are omitted. In FIG. 3, members related to operation of the second-group frame 20 are given numbers with 21, 22, 23, . . . , and members related to operation of the third-group frame 30 are given numbers with 31, 32, 33, . . . . Last one digit of these members corresponds to those of the members related to operation of the first-group frame 10 that has a same function.

A diaphragm 40 has a plurality of diaphragm blades 41, a diaphragm plate 42, a diaphragm base 43 and a diaphragm cover 44. The diaphragm base 43 and the diaphragm cover 44 hold the diaphragm plate 42 so that the diaphragm plate 42 can be freely rotatable around the optical axis. A mechanism composed of a cam and a pin is disposed between the plurality of the diaphragm blades 41 (not shown). With such a mechanism, as the diaphragm plate 42 rotates, the plurality of the diaphragm blades 41 simultaneously operate along the cam and a diaphragm is stopped down, in other word, an iris diaphragm is formed.

The diaphragm base 43 is provided with a diaphragm motor base 52 for holding a diaphragm motor 51. A motor shaft of the diaphragm motor 51 is provided with a diaphragm motor gear 53, which engages with a wheel disposed on a protrusion on an outer peripheral side of the diaphragm plate 42. As the diaphragm motor 51 rotates, the diaphragm plate 42 rotates and a size of the iris diaphragm formed by the diaphragm blades 41 can be changed. A diaphragm detection blade 54 where a plurality of slits is radially disposed about the rotating shaft is fixed to another end of the rotating shaft of the diaphragm motor 51 by press fitting and the like. A diaphragm position detector 55 composed of a photo interrupter is provided so that the diaphragm position detector 55 passes thorough an outer peripheral part of a diaphragm detection blade 54. The diaphragm motor 51, the diaphragm motor gear 53 and the like constitute the lens driving unit 304.

Next, an operation ring 60 will be described. The operation ring 60 is fitted into an outer peripheral part of the fixing frame to be freely rotatable in the optical axis direction. A cylindrical scale 61 is provided on an inner peripheral side of the operation ring 60. The scale 61 is a magnetic scale where north and south poles are alternately arranged at equal pitches circumferentially in a band shape. Longer directions of the band are the optical axis direction.

A position detecting unit 62 provided on an outer peripheral part of the fixing frame 3b to be opposed to the scale 61 is, for example, a GMR element (giant magnetoresistance element), and resistance of the position detecting unit 62 changes in accordance with change in magnetic field of the scale 61, and then relative position change to the scale 61 is output as change of a voltage signal. The motors are controlled based on this electrical signal, and that enables controlling the frames manually. Setting Manual Focus (MF) or Auto Focus (AF) is possible by operating an operation input unit 204.

The above-described motors and the position detecting unit 62 are electrically connected to a substrate 70 where a principal circuit of the photographing lens is provided via a flexible substrate. The substrate 70 is provided with a CPU. The substrate 70 is electrically connected to the main camera body 2 to transmit and receive a signal.

For the above-described motors, a rotary electromagnetic motor, a piezoelectric motor using a piezoelectric body or a linear motor that operates directly in the optical axis direction can be used, for example. Alternatively, a stepping motor can be used. The position detector is unnecessary for this case.

The position detection blades disposed at each group motor are detected by the position detector composed of the photo interrupter to detect the positions of the first-group frame 10, the second-group frame 20 and the third-group frame 30. Alternatively, the positions of the first-group frame 10, the second-group frame 20 and the third-group frame 30 may be detected by a magnetic sensing system using GMR elements or hall elements. Further alternatively, the positions of the first-group frame 10, the second-group frame 20 and the third-group frame 30 may be detected by detecting a change in capacitance. Further alternatively, the positions of the first-group frame 10, the second-group frame 20 and the third-group frame 30 may be detected by detecting movement of the frame directly. Various systems for detecting a position of the operation 60 can be also adopted same as in detecting the position of the first-group frame 10, the second-group frame 20 and the third-group frame 30.

Figure 6:
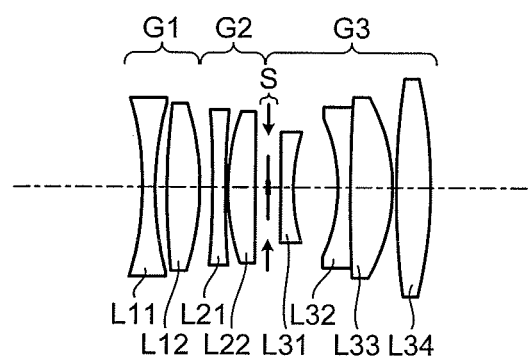
FIG. 6 is a sectional view showing a retracted state of the optical system.

A specific embodiment of the optical system 301 will be described below. FIGS. 5A to 5D are cross-sectional views showing examples of states of the optical system 301. FIG. 5A shows a cross-sectional configuration of the lens in an infinite-distance focusing state when the optical system 301 is set in the first mode (hereinafter referred to as "mode 1"). FIG. 5B shows a cross-sectional configuration of the lens in a short distance focusing state, that is, a state of focusing on a first close object, when the optical system 301 is set in the mode 1. (In FIG. 3, the lens unit 3 at this state is shown.) FIG. 5C shows a cross-sectional configuration of the lens in focusing on an object at a longest distance when the optical system 301 is set in the second mode (hereinafter referred to as "mode 2"), that is, a state of focusing on a second close object. FIG. 5D shows a cross-sectional configuration of the lens in a short distance focusing state when the optical system 301 is set in the mode 2, that is, a state of focusing on a third close object. FIG. 6 is a sectional view showing a retracted state of the optical system 301.

In FIGS. 5A to 5D, a reference symbol C denotes a plate-like cover glass disposed on a surface of the image pickup device included in the imaging unit 201. A reference symbol I denotes an image surface I formed by the optical system 301. The cover glass C may be provided on its surface with a wavelength range-limiting multilayer film, or it may have a low-pass filter function. Further, the cover glass C may have a filter function to remove adhering dust by ultrasonic oscillation. Further, the cover glass C may be divided into a plurality of plate-like cover glasses for each function.

In the mode 1, the second lens group G2 moves toward the object side to focus on the first close object from the infinite object. When the focusing is switched from the mode 1 to the mode 2 (from FIG. 5B to FIG. 5C), all lens groups move to the subject side and then the entire lens system protrudes.

In the mode 2, only the second lens group G2 moves toward the object side to focus on the third close object that is closer to the imaging apparatus 1 than the first close object from the second close object that is closer to the imaging apparatus 1 than the infinite object (from FIG. 5C to FIG. 5D). The lens storage unit 307 stores lens position data for the mode 1 and the mode 2. In the imaging apparatus 1, when a mode is set and a focusing signal is input, the lens control unit 308 moves each of the lens groups according to the mode setting. Then, the lens control unit 308 reads out the lens position control program and parameter from the lens storage unit 307 for mode switching and performs controlling.

Further, when the focusing is switched from the mode 1 to the mode 2, the lens control unit 308 performs controlling to protrude the entire lens system toward the object side so that the distance between the first lens group G1 and the third lens group G3 is increased. Thus, effect of floating helps to reduce aberration fluctuation.

It is more preferred that the following conditional expression (1) be satisfied in the optical system 301 having the above-described configuration:

$$6<dB/dA<50 \qquad (1)$$

where dA is a distance on the optical axis between an incoming plane and an outgoing plane of the focus lens group. dB is a distance on the optical axis between an incoming plane closest to the object side among incoming planes of all lens groups that move when the focusing is changed from the mode 1 to the mode 2 and an outgoing plane closest to the image side among outgoing planes of all lens groups. If the distance is variable, dB is a maximum distance. In conditional expression (1), it is more preferred that the lower limit value be 7 and further more preferably 7.5. Further, in conditional expression (1), it is more preferred that the upper limit value be 40 and further more preferably 30.

Conditional expression (1) specifies a preferred value of a ratio of an axial thickness of the lens group that move for mode changing and the focus lens group. The distance on the optical axis of the focus lens group is reduced so that the lower limit value of conditional expression (1) may not be exceeded. Accordingly, that advantageously contributes to increase speed, save power consumption and the like for auto focusing. The length in the optical axis direction of the lens group that moves in the mode changing is reduced so that the upper limit value of conditional expression (1) may not be exceeded. Accordingly, a mechanism for moving the lens group becomes smaller.

Further, it is more preferred that the second lens group G2 in the optical system 301 as a focus lens group satisfy the following conditional expressions (2) and (3):

$$2<|fA/\Delta A1|<35 \qquad (2)$$

$$2<|fA/\Delta A2|<35 \qquad (3)$$

where $\Delta A1$ is a range of movement of the focus lens group in the optical axis direction in the mode 1, $\Delta A2$ is a range of movement of the focus lens group in the optical axis direction in the mode 2, and fA is a focal length of the focus lens group. In conditional expressions (2) or (3), it is more preferred that the lower limit value be 5 and further more preferably 10. In conditional expressions (2) or (3), it is more preferred that the upper limit value be 30 and further more preferably 26.

It is preferred that the range of movement of the focus lens group have a certain size for a wider focusable range in the mode 1 and the mode 2. The refracting power of the focus lens group is properly reduced so that the lower limit values of conditional expressions (2) and (3) may not be exceeded. Accordingly, that helps to reduce aberration fluctuation caused by movement of the focus lens group and contributes to achieve focusing performance. It is preferred that the focusable range be set so that the upper limit values of conditional expressions (2) and (3) may not be exceeded in order to satisfy a user's needs for use.

Further, it is more preferred that the third lens group G3 in the optical system 301 satisfy the following conditional expression (4):

$$1<f3/f<5 \qquad (4)$$

where f3 is a focal length of the third lens group, and f is a focal length of the optical system upon focusing on the infinite object in the mode 1. In conditional expression (4), it is further more preferred that the lower limit value be 2 and the upper limit value be 4.

Conditional expression (4) specifies a preferred value of the refracting power of the third lens group. The positive refracting power of the third lens group is reduced so that the lower limit value of conditional expressions (4) may not be exceeded. Accordingly, that helps to reduce aberration such as curvature of field. The positive refracting power of the third lens group is achieved so that the upper limit value of conditional expressions (4) may not be exceeded. Accordingly, it becomes easier to shorten the total length of the optical system, which is advantageous in achieving size reduction of the lens barrel.

Further, it is more preferred that the second lens group G2 in the optical system 301 satisfy the following conditional expression (5):

$$0.5<|fA/f|<10 \qquad (5)$$

In conditional expression (5), it is more preferred that the lower limit value be 0.7 and further more preferably 1. Further, in conditional expression (5), it is more preferred that the upper limit value be 8 and further more preferably 6.

Conditional expression (5) specifies a preferred value of the refracting power of the focus lens group. The refracting power is adjusted so that the lower limit value of conditional expressions (5) may not be exceeded to prevent an excessive focusing sensitivity of the focus lens. Accordingly, focusing control becomes easier. The refracting power is adjusted so that the upper limit value of conditional expressions (5) may not be exceeded. Accordingly, the focusable range is widened as an increase in an amount of movement for focusing is reduced, and that leads to size reduction of the lens barrel.

Further, it is preferred that the following conditional expressions (6) be satisfied when the mode change lens group is made up of two lens groups and the lens group closer to the object side is a first mode change lens group and the lens group closer to the image side is the second mode change lens group:

$$0.00<|(D1G-D2G)/D1G|<1.00 \qquad (6)$$

where D1G is a moving distance of the first mode change lens group toward the object side when the focusing is changed from the mode 1 to the mode 2 and D2G is a moving distance of the second mode change lens group toward the object side when the focusing is changed from the mode 1 to the mode 2. In conditional expression (6), it is more preferred that the lower limit value be 0.001, further more preferably 0.0055, further more preferably 0.015 and the most preferably 0.10. Further, in conditional expression (6), it is more preferred that the upper limit value be 0.60, further more preferably 0.40 and further more preferably 0.30.

The distance between the first mode change lens group and the second mode change lens group is changed and both lens groups are moved toward the object side so that the lower and upper limit values of conditional expression (6) may not be exceeded. Thus correction function for aberration caused by distance change is achieved. Accordingly, that is advantageous in reducing aberration fluctuation in the mode 1 and the mode 2. Further, it is preferred that photographing magnification in focusing on the third close object in the mode 2 be a maximum photographing magnification of the optical system. That advantageously contributes to increase focus speed at a nearly maximum photographing magnification, for example.

It is possible to combine conditional expressions (1), (2), (3), (4), (5) and (6) arbitrarily. It also is possible to restrict the upper or lower limit values further.

According to the optical system 301 having the above-described configuration, a configuration is possible where the distances in the two modes (mode 1 and mode 2) between the mode change lens group made up of the first lens group G1 and the third lens group G3 and the focus lens group made up of the second lens group G2 are not too long. Accordingly, the optical system 301 is suitable to reduce a mechanism size.

Further, according to the optical system 301, in switching between the two modes, ranges of the photographable object-image distance partially overlap. Accordingly, it is possible to prevent hollow defect in the ranges of the photographable object-image distance.

Further, according to the optical system 301, when the focusing is changed from the mode 1 to the mode 2, both of the mode change lens groups and the focus lens group move toward the object side. Accordingly, a configuration is possible where off-axial light beam of the focus lens group is not high. Further, the diameter of the focus lens groups is reduced and weight reduction of the focus lens group is achieved.

Further, according to the optical system 301, since the focus lens group is disposed between the plurality of the mode change lens groups, a size in the diameter and weight is reduced. A configuration is possible where thickness of the optical system in the optical axis direction is reduced, and that advantageously contributes to achieve size reduction of the optical system. Further, according to the optical system 301, that advantageously contributes to increase focus speed and save power consumption for focusing in the mode 1 and the mode 2.

In FIG. 5, the object-image distance in focusing on the second close object is longer than that in focusing on the first close object. Further, the magnification (absolute value) in focusing on the second close object is smaller than that in focusing on the first close object.

State change from the first close object focusing state to the second close object focusing state is shown in FIG. 5. However, movements of the lens groups in the mode changing are not limited to this.

For example, the lens groups may be moved toward the object side while a position of the second lens group G2 (focus lens group) is adjusted so that magnification may stay constant during the mode changing operation. Alternatively, the second lens group G2 may be moved so that absolute values of the magnification may continuously increase during the mode changing operation.

Alternatively, when the focusing is changed from the mode 1 to the mode 2, the first lens group and the second lens group may be moved toward the object side so that the distance between the first lens group and the second lens group may stay constant. Accordingly, focusing can be continuously performed despite a closer distance state comparing to the close distance state in the mode 1. Alternatively, when the optical system is retracted, the first lens group and the second lens group may be positioned nearer to the third lens group, and, the first lens group, the second lens group and the third lens group may be controlled to be moved toward the image side so that the distance between the third lens group and the first lens group and the second lens group may stay constant (FIG. 6).

In any of these cases, the position of the focus lens group in the mode changing is uniquely determined. Accordingly, that enables to determine the magnification uniquely in the mode changing.

Numerical data for this embodiment will be shown below. In the following data, IH denotes an image height, $F_{No}$ denotes an F number, $\omega$ denotes a half angle of field, r denotes radius of curvature of each lens surface, d denotes a distance between lens surfaces, nd denotes a refractive index of each lens for a d-line, vd denotes an Abbe constant for each lens. In the numerical data below, length is given in mm and an angle is given in degree (°). In the numerical data, the object distance is set to be an infinite, however, the focus state is changed by moving the lens groups.

The biconcave negative lens L11 that makes up the first lens group has aspheric surfaces on both sides. Here let x denote an optical axis provided that the direction of travel of light is positive, and y denote a direction orthogonal to the optical axis. Then, aspheric configuration is given by the following conditional expression (7):

$$x=(y^2/r)/[1+\{1-(K+1)(y/r)^2\}^{1/2}]+A_4y^4+A_6y^6+A_8y^8+A_{10}y^{10}+A_{12}y^{12} \quad (7)$$

where r denotes a paraxial radius of curvature, K denotes a conical coefficient, $A_4$, $A_6$, $A_8$, $A_{10}$, $A_{12}$ are a fourth, sixth, eighth, tenth and twelfth aspheric surface coefficients, respectively.

1-1. Surface Data

TABLE 1

| Surface no. | r | d | nd | vd |
|---|---|---|---|---|
| Object plane | ∞ | ∞ | | |
| 1* | −28.416 | 1.00 | 1.58313 | 59.38 |
| 2* | 27.152 | 0.90 | | |
| 3 | 59.029 | 2.61 | 1.88300 | 40.76 |
| 4 | −22.026 | Variable | | |
| 5 | −83.975 | 1.00 | 1.84666 | 23.78 |
| 6 | 79.450 | 0.20 | | |
| 7 | 18.492 | 2.23 | 1.88300 | 40.76 |
| 8 | −589.840 | Variable | | |
| 9 | ∞ | Variable | | |
| 10 (Stop) | | ∞ | 1.00 | |
| 11 | 1036.210 | 1.00 | 1.72825 | 28.46 |
| 12 | 14.719 | 3.59 | | |
| 13 | −13.597 | 1.00 | 1.84666 | 23.78 |
| 14 | 149.004 | 3.37 | 1.81600 | 46.62 |
| 15 | −14.745 | 0.30 | | |
| 16 | 63.836 | 2.78 | 1.90366 | 31.32 |
| 17 | −38.092 | 9.23 | | |
| 18 | ∞ | Variable | | |
| 19 | ∞ | 4.08 | 1.51633 | 64.14 |
| 20 | ∞ | 1.30 | | |
| Image plane (Light receiving surface) | ∞ | | | |

1-2. Aspherical Data

1st surface:

K=−1.656, $A_4$=−3.45569×10$^{-5}$, $A_6$=−1.81632×10$^{-7}$, $A_8$=1.42064×10$^{-11}$

2nd surface:

K=−10.037, $A_4$=8.25272×10$^{-5}$, $A_6$=−5.69998×10$^{-7}$ 1-3. Zoom Data

TABLE 2

|  | Infinite distance | Close object 1 | Close object 2 | Close object 3 |
|---|---|---|---|---|
| IH | 11.15 | 11.15 | 11.15 | 11.15 |
| Focal length | 24.91 | 25.29 | 25.14 | 25.53 |
| $F_{no.}$ | 2.86 | 2.63 | 2.82 | 2.59 |
| 2ω(°) | 50.20 | 44.84 | 46.35 | 41.36 |
| d4 | 3.75 | 1.00 | 3.75 | 1.00 |
| d8 | 1.00 | 3.75 | 1.00 | 3.75 |
| d9 | 0.00 | 0.00 | 0.50 | 0.50 |
| d18 | 9.63 | 9.63 | 12.00 | 12.00 |

1-4. Lens Unit Focal Length
f1=58.60, f2=34.63, f3=63.39
Practical numerical values of the conditional expressions (1) to (6) in this embodiment will be cited.

TABLE 3

| Object-image distance | | |
|---|---|---|
| | Close object 1 | 251.8097913 |
| | Close object 2 | 266.7908343 |
| | Close object 3 | 161.9904492 |
| Magnification | | |
| | Close object 1 | −0.129870803 |
| | Close object 2 | −0.12080338 |
| | Close object 3 | −0.249995456 |
| dB/dA | | 7.511309098 |
| \| fA/ΔA1 \| | | 12.58517245 |
| \| fA/ΔA2 \| | | 12.58517245 |
| \| fA/f \| | | 1.390170081 |
| \| f3/f \| | | 2.54441 |
| \| (D1G − D2G)/D1G \| | | 0.174216 |

Figure 7:
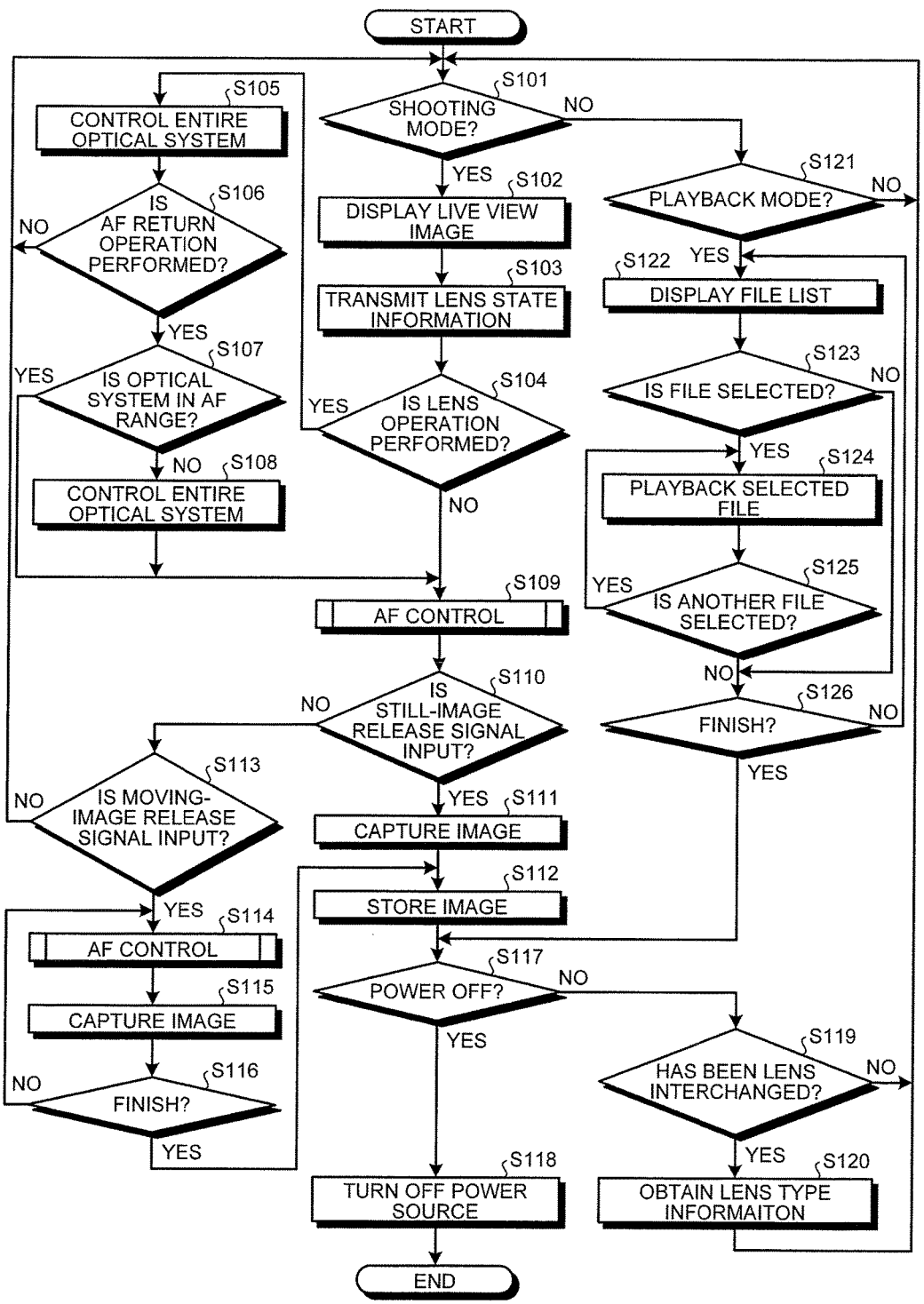
FIG. 7 is a flow chart showing a process outline of the imaging apparatus.

Next, operation of the imaging apparatus 1 having the above-described configuration will be described. FIG. 7 is a flow chart showing the process outline of the imaging apparatus 1. In FIG. 7, a state when the imaging apparatus 1 is set in a photo shooting mode will be described (step S101: Yes). For this state, a live view image display on the display unit 205 is executed by the main control unit 212 (step S102). Subsequently, the lens control unit 308 transmits lens state information to the main control unit 212 (step S103). At step S103, information such as mode of the inner focus lens and focusing of the optical system 301 is transmitted from the lens control unit 308 to the main control unit 212. The main control unit 212 is capable of determining which mode is set, where the lenses are disposed on focal positions and the like.

After that, when a lens operation is performed (step S104: Yes), the lens control unit 308 performs an entire control to move the entire optical system 301 via the lens driving unit 303 (step S105). After the entire control, an icon to input AF return operation is displayed on a screen of the display unit 205.

When a position corresponding to this icon on the touch panel 6 is pressed by a user to input an instruction of the AF return operation (step S106: Yes) and the optical system 301 is in an AF range (step S107: Yes), the process of the imaging apparatus 1 proceeds to step S109. On the other hand, when the instruction of the AF return operation is input at step S106 and the optical system 301 is not in the AF range (step S107: No), the lens control 308 controls the entire optical system 301 (step S108).

At step S104, when the lens operation is not performed (step S104: No), the lens control unit 308 performs AF control. Details of the AF control will be described later.

After the lens control unit 308 performs the AF control, when the release switch 242 is pressed to input a still-image release signal (step S110: Yes), the imaging apparatus 1 captures an image (step S111) and the acquired image is stored in the storage unit 211 (step S112).

On the other hand, when the still-image release signal is not input (step S110: No) and the moving image switch 246 is pressed to input a moving-image release signal (step S113: Yes), the lens control unit 308 performs the same AF control as step S109 (step S114). After that, the imaging apparatus 1 captures an image (step S115). At step S113, when the moving-image release signal is not input (step S113: No), the process of the imaging apparatus 1 returns to step S101.

After step S115, when a signal to finish photo shooting is input (step S116: Yes), the process of the imaging apparatus 1 proceeds to step S112. On the other hand, after step S115, when the signal to finish photo shooting is not input (step S116: No), the process of the imaging apparatus 1 returns to step S114.

After step S112, when the power switch 241 is pressed (step S117: Yes), the main control unit 212 performs control to turn off power source (step S118) and ends a series of processes.

After step S112, when the power switch 241 is not pressed (step S117: No) and the lens unit 3 has been interchanged to another lens 3 (hereinafter referred to as "lens unit 3'" to distinguish from the lens unit 3) (step S119: Yes), the main control unit 212 obtains lens type information from the lens unit 3' newly attached (step S120). After that, the process of the imaging apparatus 1 returns to step S101. On the other hand, when the power switch 241 is not pressed (step S117: No) and the lens unit 3 has not been interchanged to another lens 3 (step S119: No), the process of the imaging apparatus 1 returns to step S101.

Next, at step S101, a state when the imaging apparatus 1 is not set in the photo shooting mode will be described (step S101: No). For this state, when the imaging apparatus 1 is in a playback mode (step S121: Yes), the main control unit 212 displays a file list on the display unit 205 (step S122).

After that, when a file to be enlarged is selected through the operation input unit 204 or the touch panel 206 (step S123: Yes), the main control unit 212 reproduces and displays the selected file on the display unit 205 (step S124).

Subsequently, when another file is selected (step S125: Yes), the process of the imaging apparatus 1 returns to step S124. On the other hand, when another file is not selected (step S125: No), the process of the imaging apparatus 1 proceeds to step S126.

At step S126, when an end instruction is input through the operation input unit 204 or the touch panel 206 (step S126: Yes), the process of the imaging apparatus 1 proceeds to step S117. On the other hand, when the end instruction is not input (step S126: No), the process of the imaging apparatus 1 returns to step S122.

At step S123, when the file to be enlarged is not selected through the operation input unit 204 or the touch panel 206 (step S123: No), the process of the imaging apparatus 1 proceeds to step S126.

At step S121, when the imaging apparatus 1 is not in the playback mode, the process of the imaging apparatus 1 returns to step S101.

Figure 8:
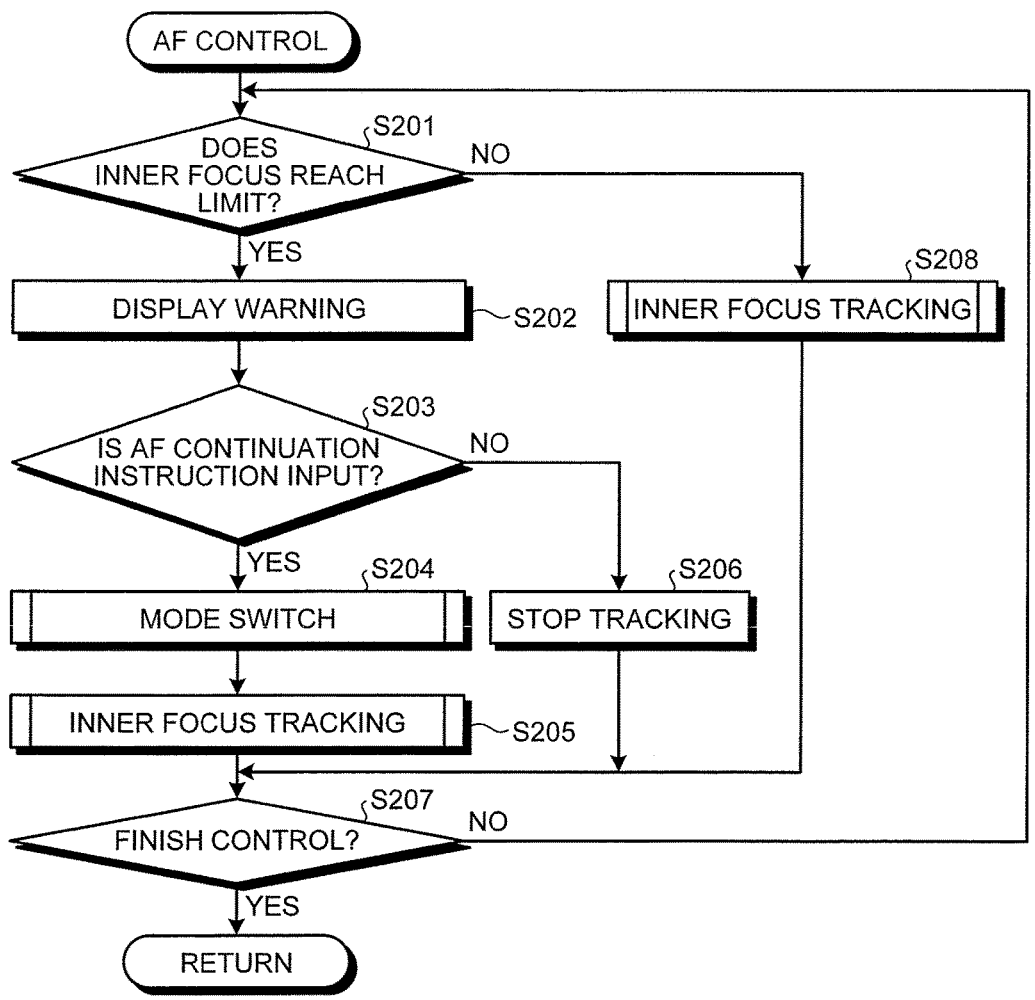
FIG. 8 is a flow chart showing an outline of AF control operation of the imaging apparatus.
Figure 9:
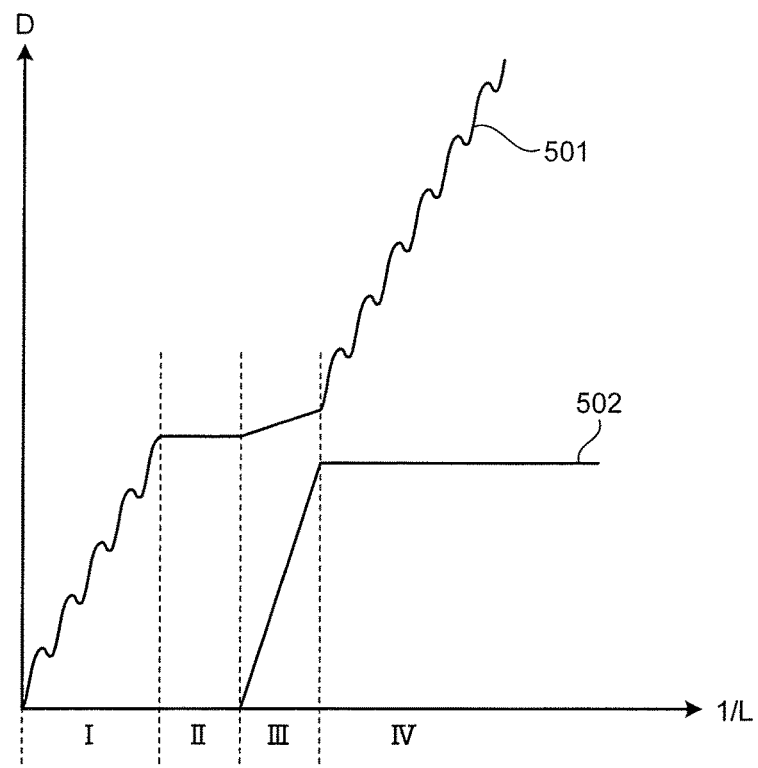
FIG. 9 is a graph showing relationship between inverse of a distance between the imaging apparatus and any subject and a feeding position of the lens unit.

FIG. 8 is a flow chart showing the outline of the AF control operation of the imaging apparatus 1 (steps S109 and S114 shown in FIG. 7). FIG. 9 is a graph showing relationship between the inverse of the distance between the imaging apparatus 1 and any subject and the feeding position of the lens unit 3 during the AF control operation. In FIG. 9, the abscissa 1/L represents the inverse of the distance L between the imaging apparatus 1 and the subject, and the ordinate D represents a value obtained by converting the feeding position of the lens unit 3 into a focusing distance. A curve 501 shown in FIG. 9 schematically shows an extended amount of the inner focus lens during the AF control. In the above-described optical system 301, the inner focus lens is the second lens group G2. A curve 502 shown in FIG. 9 schematically shows extension of the entire optical system 301 during the AF control.

In FIG. 8, when the lens control unit 308 determines that, based on the feeding position of the inner focus lens, the inner focus lens reaches the limit region for focusing (step S201: Yes), the lens control unit 308 transmits information indicating that the inner focus lens reaches the limit region for focusing to the main control unit 212. The main control unit 212 displays a warning on the display unit 205 based on the information transmitted from the lens control unit 308 (step S202).

Figure 10:
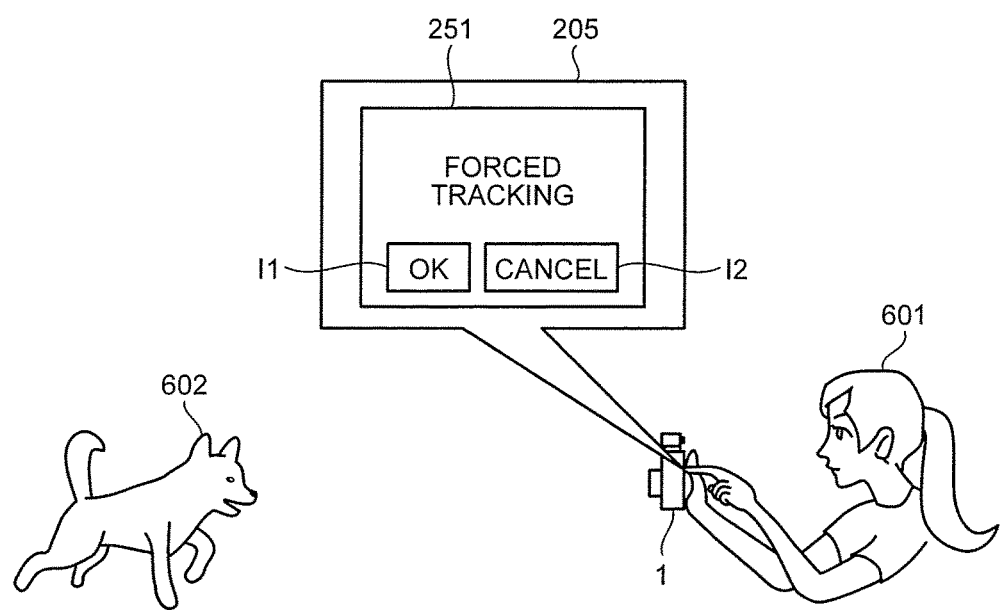
FIG. 10 is a diagram showing a display example of a warning and schematically shows how the warning is displayed on the imaging apparatus.

FIG. 10 shows a display example of a warning and schematically shows how the warning is displayed. Specifically, in FIG. 10, a photographer 601 viewing a live view image displayed on the display unit 205 has touched a dog 602 on the display screen as a subject to be photographed and decided the subject to be tracked. As shown in FIG. 10, when the inner focus lens reaches the limit region for focusing, a warning display screen 251 consisted of a message of "FORCED TRACKING" and two icons I1 and I2 displayed as "OK" and "CANCEL", respectively is displayed on the display unit 205. If the inner focus lens reaches the limit region for focusing as just described, the inner focus lens is fixed once (See a sector II in FIG. 9). It is noted that a sector I in FIG. 9 shows a state before the inner focus lens reaches the limit region for focusing. In the sector I, the inner focus lens is controlled by the lens control unit 308 so that the inner focus lens may protrude gradually while wobbling. Since the inner focus lens wobbles in such a manner, moving direction of the inner focus lens can be judged instantly using contrast change information at that time. As a result, focusing speed of the imaging apparatus 1 in photography can be increased. Especially in photography of moving images, focusing of the imaging apparatus 1 can be smoothly performed. The main control unit 212 gives instruction for wobbling and focusing direction and movement. The lens control unit 308 controls the lenses for wobbling and focusing control based on the instruction received from the main control unit 212.

Figure 11:
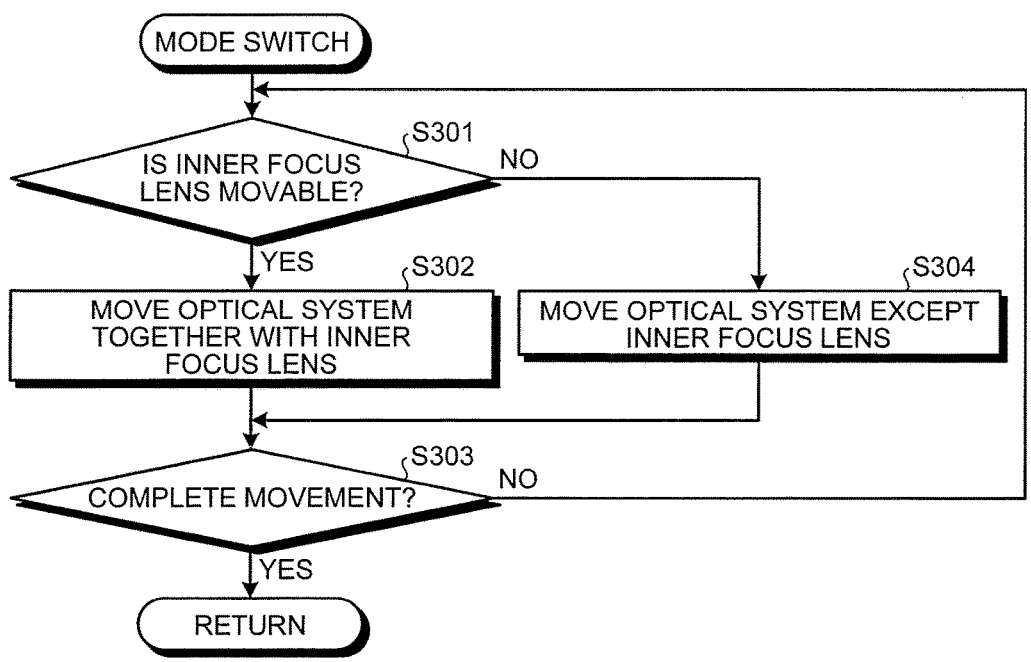
FIG. 11 is a flow chart showing a process outline of mode switching of the imaging apparatus.

In a state shown in FIG. 10, when the icon I1 is selected and a continuation AF instruction is input (step S203: Yes), the imaging apparatus 1 performs mode switching (step S204). The lens control unit 208 transmits information regarding the switched mode to the main control unit 212 via the lens communication unit 306 and the first communication unit 207. FIG. 11 is a flow chart showing the process outline of mode switching. In FIG. 11, when the inner focus lens is movable (step S301: Yes), the lens control unit 308 moves the lens groups of the entire optical system 301 including the inner focus lens to bring into focus (step S302). This process of step S302 is shown in a sector III in FIG. 9.

Subsequently, when the mode switching is completed (step S303: Yes), the imaging apparatus 1 returns to the main routine of the AF control. On the other hand, when the mode switching is not completed (step S303: No), the process of the imaging apparatus 1 returns to step S301.

At step S301, when the inner focus lens is not movable (step S301: No), the lens control unit 308 moves the lens groups excepting the inner focus lens (step S304). Subsequently, the process of the imaging apparatus 1 proceeds to step S303.

Figure 12:
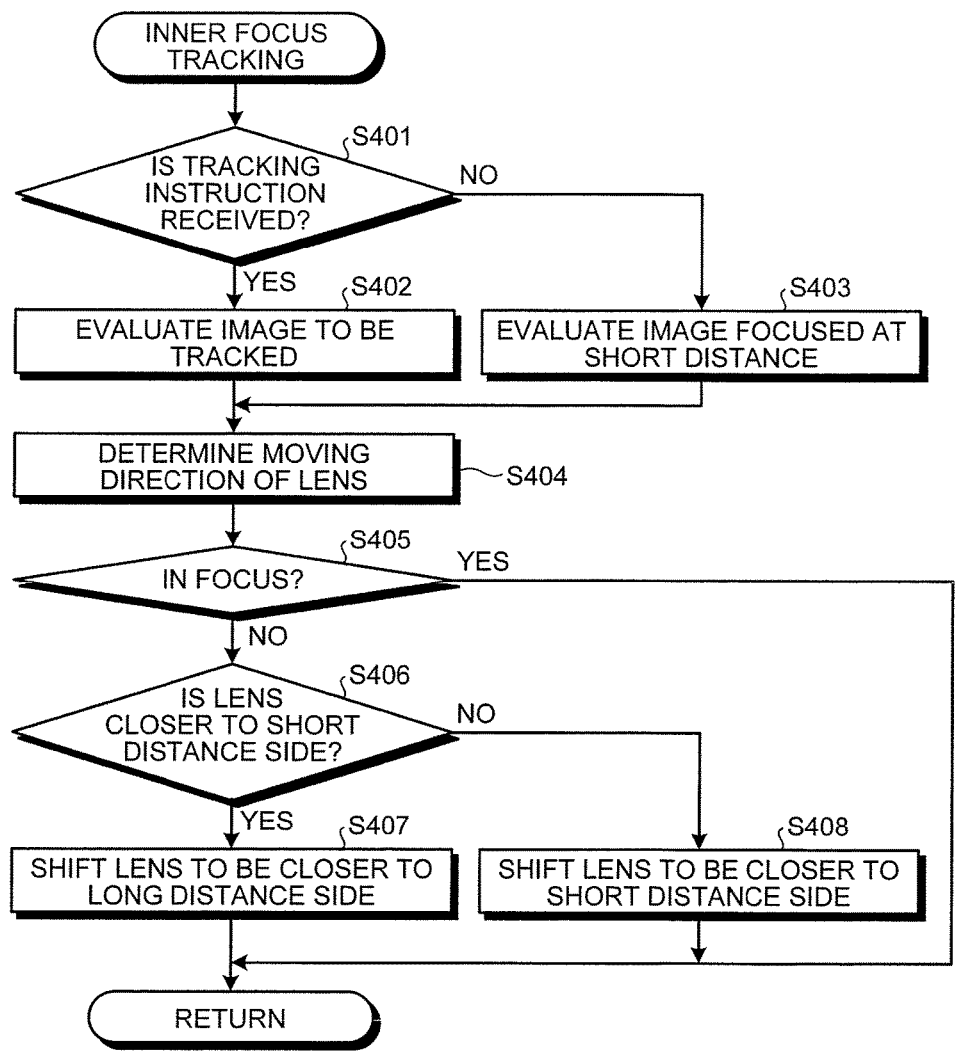
FIG. 12 is a flow chart showing a process outline of inner focus tracking of the imaging apparatus according to the invention.

After the imaging apparatus 1 completes the mode switching at step S204, the imaging apparatus 1 performs tracking using the inner focus lens (inner focus tracking) (step S205). FIG. 12 is a flow chart showing the process outline of the inner focus tracking of the imaging apparatus 1. In FIG. 12, when a specific subject in the image is selected through the operation input unit 204 or the touch panel 206 and thus a tracking instruction is input (step S401: Yes), the lens control unit 308 evaluates the image to be tracked (step S402). On the other hand, the tracking instruction is not input (step S401: No), the lens control unit 308 evaluates an entire image for focusing the nearest subject (step S403).

A sector IV in FIG. 9 shows a state when the imaging apparatus 1 performs the AF control again. In this state, the inner focus lens judges focal deviation while wobbling. When the subject comes closer while the inner focus lens is judging the focal deviation, the inner focus lens protrudes following the movement of the subject. Specifically, in the sector IV, in the optical system 301, only the second lens group G2 moves, however, the first lens group G1 and the third lens group G3 do not move. The main control unit 212 gives an instruction for timing of wobbling. On the other hand, the lens control unit 308 performs lens control during the wobbling according to parameters stored in the lens storage unit 307.

After steps S402 or S403, the main control unit 212 performs a determination of the moving direction and an adjustment focusing condition of the lens (step S404). The moving direction is determined based on wobbling operation. The lens control unit 308 instructs the wobbling based on the control signal received from the main control unit 212 and performs the lens control according to the instructed moving direction and amount.

When it is determined as a result of step S404 that the lens is in focus (step S405: Yes), the process of the main control unit 212 returns to the AF control.

When it is determined as the result of step S404 that the lens is not in focus (step S405: No) and the inner focus lens is closer to the short distance (step S406: Yes), the lens control unit 308 shifts the inner focus lens to be closer to the long distance (step S407). On the other hand, when it is determined as the result of step S404 that the lens is not in focus (step S405: No) and the inner focus lens is not closer to the short distance (step S406: No), the lens control unit 308 shifts the inner focus lens to be closer to the short distance (step S408). After the steps S407 or S408, the process of the imaging apparatus 1 returns to the main routine. The processes of steps S402 through S408 are controlled by the main control unit 212 and the lens control unit 308 together. Specifically, the main control unit 212 performs determination and instruction, and the lens control unit 308 performs actual control for movement.

The sector IV in FIG. 9 shows a state when the imaging apparatus 1 performs the AF control again. In this state, the inner focus lens protrudes while wobbling and the entire optical system 301 is fixed. That is, in the sector IV, only the second lens group G2 moves, however, the first lens group G1 and the third lens group G3 do not move.

Referring again to FIG. 8, the process of the AF control will be described. At step S203, when the AF continuation instruction is not input (step S203: No), the imaging apparatus 1 stops tracking (step S206). Subsequently, the process of the imaging apparatus 1 proceeds to step S207.

At step S207, when an instruction signal to finish the control is input (step S207: Yes), the process of the imaging apparatus 1 returns to the main routine of the AF control. On the other hand, at step S207, when the instruction signal to finish the control is not input (step S207: No), the process of the imaging apparatus 1 returns to step S201.

At step S201, when the inner focus lens does not reach the limit region for focusing (step S201: No), the imaging apparatus 1 performs the inner focus tracking (step S208). The process of the inner focus tracking is the same as step S205.

According to the imaging apparatus described above, it is possible to change protrusion and retraction of the optical system naturally near the limit region of the focus lens group. Accordingly, control depending on characteristics of the optical system and photo shooting conditions is possible.

Further, the imaging apparatus described above advantageously contributes to reducing driving sound (silence noise), increasing auto focus speed, and is advantageous in silence noise even in a short distance range.

Further, the imaging apparatus described above enables the most suitable focusing for the subject in macro mode and by a user's AF operation. In addition, the imaging apparatus enables control that follows operations naturally and quickly with an energy-saving effect.

Further, a camera with the compact optical system described above is easy to carry. Furthermore, a subject in a short distance is supported since quick and silent focusing for moving images is a priority.

Figure 13:
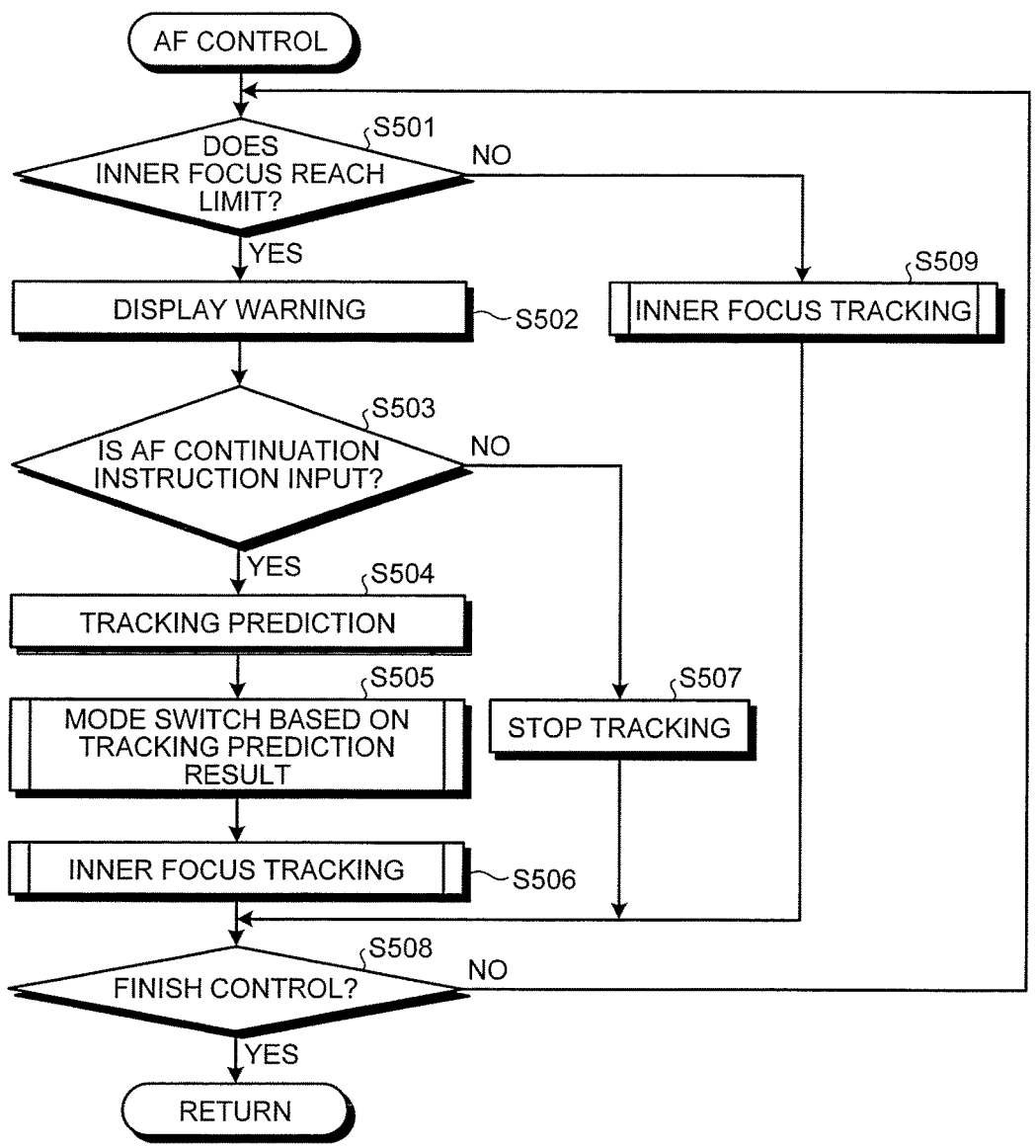
FIG. 13 is a flow chart showing a process outline of AF control operation of the imaging apparatus according to a variation of the present invention.
Figure 14:
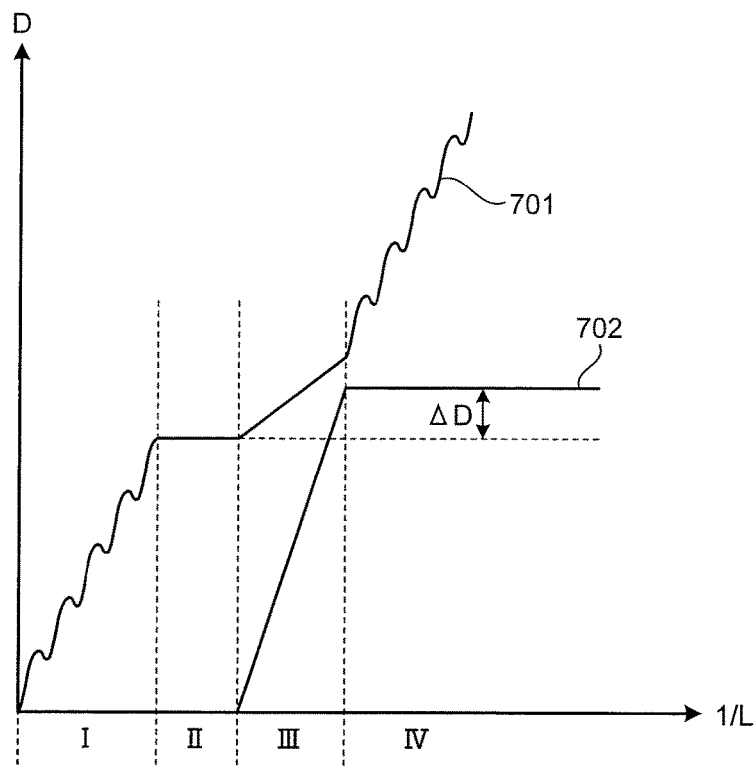
FIG. 14 is a graph showing relationship between the inverse of a distance between the imaging apparatus according to the variation of the present invention and any subject and the feeding position of the lens unit.

FIG. 13 is a flow chart showing the process outline of AF control of an imaging apparatus according to a variation of the present invention. The configuration of the imaging apparatus according to the variation is the same as the imaging apparatus 1 described above. FIG. 14 is a graph showing relationship between the inverse of the distance between the imaging apparatus 1 and any subject and the feeding position of the lens unit. In FIG. 14, the abscissa 1/L represents the inverse of the distance L between the imaging apparatus 1 and the subject, and the ordinate D axis represents a value obtained by converting the feeding position of the lens unit 3 into a focusing distance. A curve 701 shown in FIG. 14 schematically shows an extended amount of the inner focus lens (the second lens group G2) during the AF control. A curve 702 shown in FIG. 14 schematically shows extension of the entire optical system 301 during the AF control.

Figure 15:
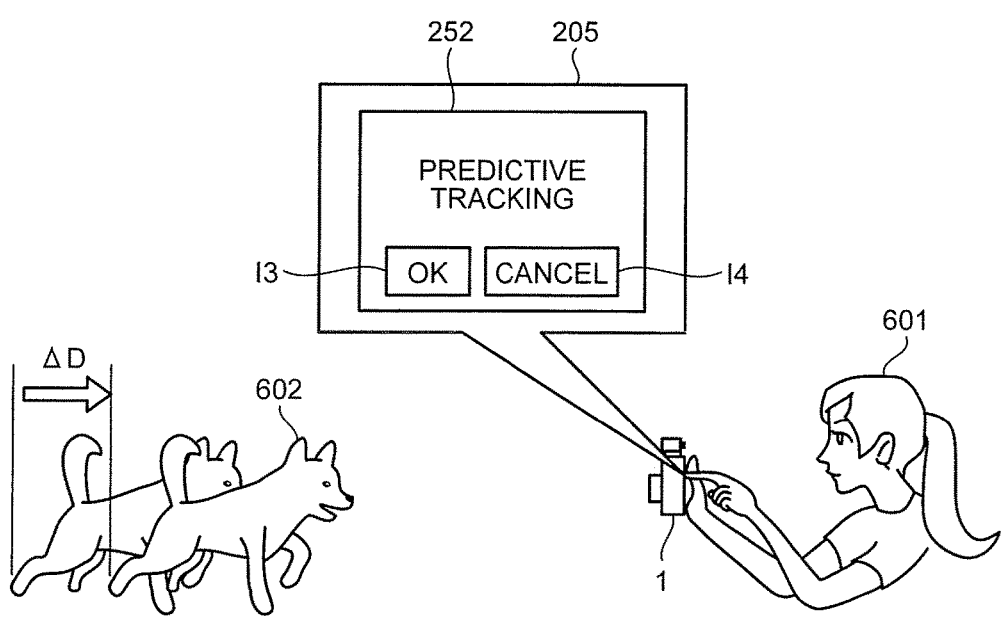
FIG. 15 is a diagram showing a display sample indicating a warning and schematically shows how the warning is displayed on the imaging apparatus according to the variation of the present invention.

In FIG. 13, when the lens control unit 308 determines that, based on the feeding position of the inner focus lens, the inner focus lens reaches the limit region for focusing (step S501: Yes), the lens control unit 308 transmits information indicating that the inner focus lens reaches the limit region for focusing to the main control unit 212. The main control unit 212 displays a warning on the display unit 205 based on the information transmitted from the lens control unit 308 (step S502). FIG. 15 shows a display example of a warning and schematically shows how the warning is displayed on the imaging apparatus according to the variation. Specifically, in FIG. 15, the photographer 601 viewing a live view image displayed on the display unit 205 has touched the dog 602 on the display screen as a subject to be photographed and decided the subject to be tracked. As shown in FIG. 15, when the inner focus lens reaches the limit region for focusing, a warning display screen 252 consists of a message of "PREDICTIVE TRACKING" and two icons I3 and I4 displayed as "OK" and "CANCEL", respectively is displayed on the display unit 205. Thus, if the inner focus lens reaches the limit region for focusing, the position of the inner focus lens is fixed once (a sector II in FIG. 14). It is noted that a sector I in FIG. 14 shows a state before the inner focus lens reaches the limit region for focusing as the same as shown in FIG. 9.

In a state shown in FIG. 15, when the icon I3 is selected and a continuation AF instruction is input (step S503: Yes), the main control unit 212 performs tracking prediction (step S504). In the tracking prediction, a motion vector at a representative point of a subject is used, for example, to calculate a movement velocity of the subject, and a movement distance ΔD after elapse of a predetermined time is acquired. Accordingly, in this variation, the main control unit 212 has a function as a prediction calculating unit for predicting position change of the subject.

After step S504, the imaging apparatus 1 performs mode switching based on the tracking prediction result (step S505). This mode switching is the same as the above-described embodiment except that the movement distance of the optical system 301 is determined based on the prediction result (See FIG. 11). The mode switching is shown in a sector III in FIG. 14.

Subsequently, the imaging apparatus 1 performs inner focus tracking (step S506). A sector IV in FIG. 14 shows a state when the imaging apparatus 1 performs the AF control again. In this state, the lens control unit 308 instructs the inner focus lens to wobble, and when the subject comes closer while the main control unit 212 is judging focal deviation, the inner focus lens protrudes following the subject. In this instance, in the sector IV, only the second lens group G2 moves, however, the first lens group G1 and the third lens group G3 do not move.

Steps S506 to S509 sequentially correspond to steps S205 to S208 in FIG. 8. The process of the inner focus tracking at step S509 is the same as step S506 described above.

As the same as the embodiment of the invention described above, according to the variation of the invention described above, the control depending on characteristics of the optical system and photo shooting conditions is possible.

Variation of the Optical System

Next, a variation of the optical system included in the imaging apparatus will be described. In this variation, a lens configuration of the optical system is the same as that of the above-described embodiment. In this variation, the optical system 301 has a third mode 1 (hereinafter referred to as "mode 3-1"), a third mode 2 (hereinafter referred to as "mode 3-2") and a third mode 3 (hereinafter referred to as "mode 3-3") to add to the mode 1 and the mode 2. When an object-image distance at the shortest distance in the mode 2 ("Close object 3" in the numerical data) denotes L, the distance in the mode 3-1 (first variation) is 4L, the distance in the mode 3-2 (second variation) is 2L and the distance in the mode 3-3 (third variation) is 4L/3.

When the focusing is changed from the mode 1 to the mode 3-1, the second lens group G2 moves toward a default position to be uniquely determined. Similarly, in the mode 3-2 and the mode 3-3, the second lens group G2 moves toward default positions, respectively, which are determined depending on each entire feeding position for the inner focus lens group. When a lens system is designed, data for the entire feeding positions is determined and is stored in the lens storage unit 307 in a table format as a parameter.

In the mode 2, the default position is at the shortest object point (Close object 3). When the focusing is changed from the mode 1 to the mode 2, the position of the focus lens group sequentially shifts in order of from the infinite object point of the mode 1, the default position of the mode 3-1, the default position of the mode 3-2, the default position of the mode 3-3 and to the shortest object point of the mode 2.

The above-described focus position determination during the mode changing enables specific magnification depending on the entire extension operation. Accordingly, magnification setting with a scale and the like is performed, and that is advantageous for manual focusing operation. Further, when focusing is performed by auto-focus in each mode, the second lens group as the focus lens group is moved and fast focusing in each mode state is possible. It is preferred that the user be appropriately allowed to set extension of entire optical system or movement of only the focus lens group in order to focus on the short distance.

Figure 16A:
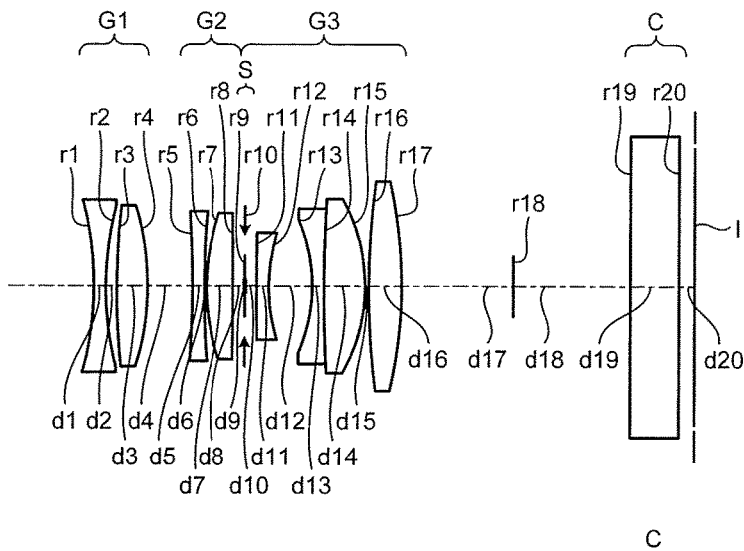
FIG. 16A is a diagram showing a cross-sectional configuration of the optical systems of the lens unit in focusing on an object at a long distance when the optical system is set in mode 3-1.
Figure 16B:
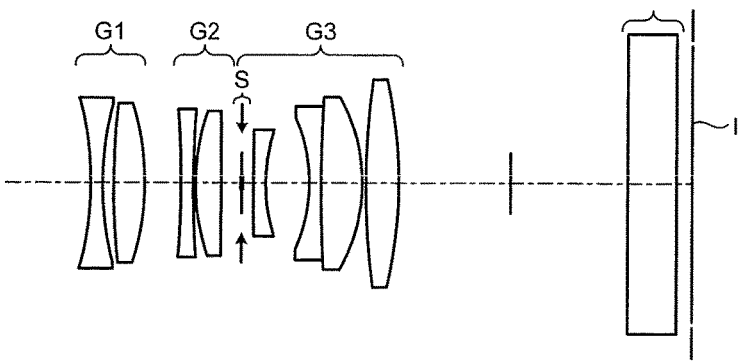
FIG. 16B is a diagram showing a cross-sectional configuration of the optical system in a focusing state with a default state when the optical system is set in mode 3-1.
Figure 16C:
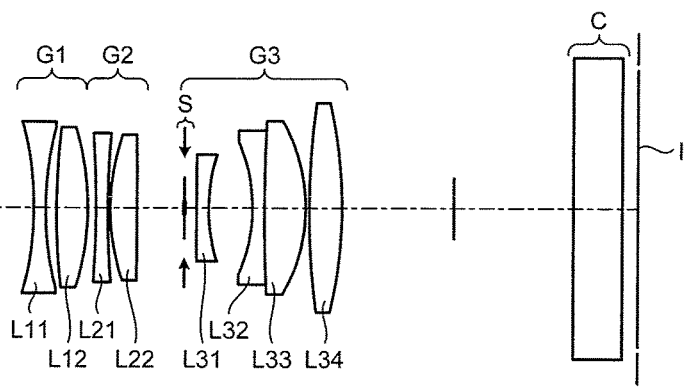
FIG. 16C is a diagram showing a cross-sectional configuration of the optical system in focusing on an object at a short distance when the optical system is set in mode 3-1.

FIGS. 16A to 16C are sectional views showing examples of states of the mode 3-1. Specifically, FIG. 16A shows a cross-sectional configuration of the lens in focusing on an object at a long distance in the mode 3-1. FIG. 16B shows a cross-sectional configuration of the lens in a focusing state with a default state in the mode 3-1. FIG. 16C shows a cross-sectional configuration of the lens in focusing on an object at a short distance in the mode 3-1. In the mode 3-1, the second lens group moves toward a subject side to focus on the subject. (from FIG. 16B to FIG. 16C)

Figure 17A:
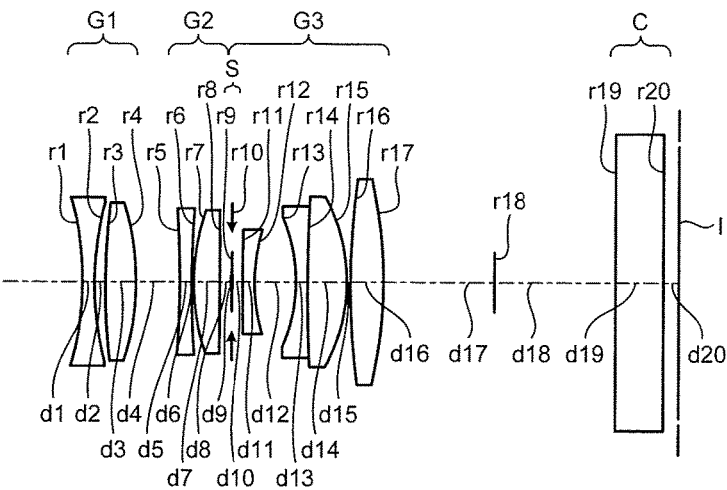
FIG. 17A is a diagram showing a cross-sectional configuration of the optical system in focusing on an object at a long distance when the optical system is set in mode 3-2.
Figure 17B:
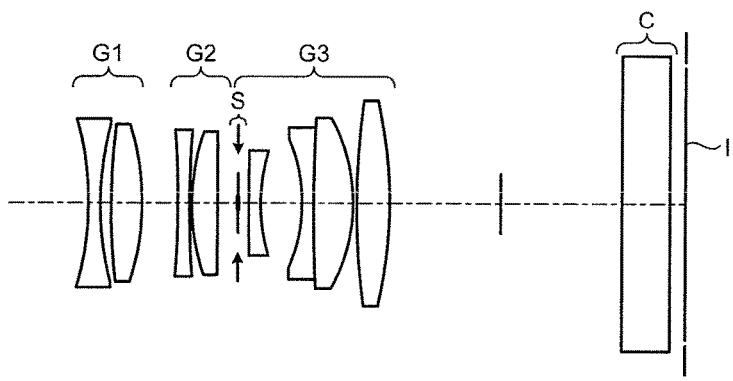
FIG. 17B is a diagram showing a cross-sectional configuration of the optical system in a focusing state with a default state when the optical system is set in mode 3-2.
Figure 17C:
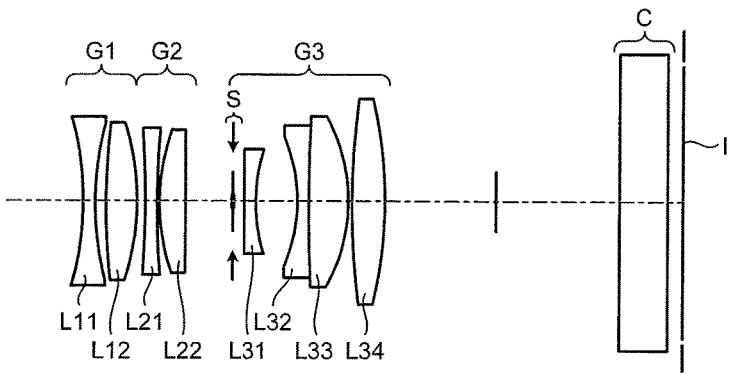
FIG. 17C is a diagram showing a cross-sectional configuration of the optical system in focusing on an object at a short distance when the optical system is set in mode 3-2.

FIGS. 17A to 17C are the sectional views showing examples of states of the mode 3-2. Specifically, FIG. 17A shows a cross-sectional configuration of the lens in focusing on an object at a long distance of mode 3-2. FIG. 17B shows a cross-sectional configuration of the lens in a focusing state with a default state in mode 3-2. FIG. 17C shows a cross-sectional configuration of the lens in focusing on an object at a short distance in mode 3-2. The focusing is performed the same as in the mode 3-1.

Figure 18A:
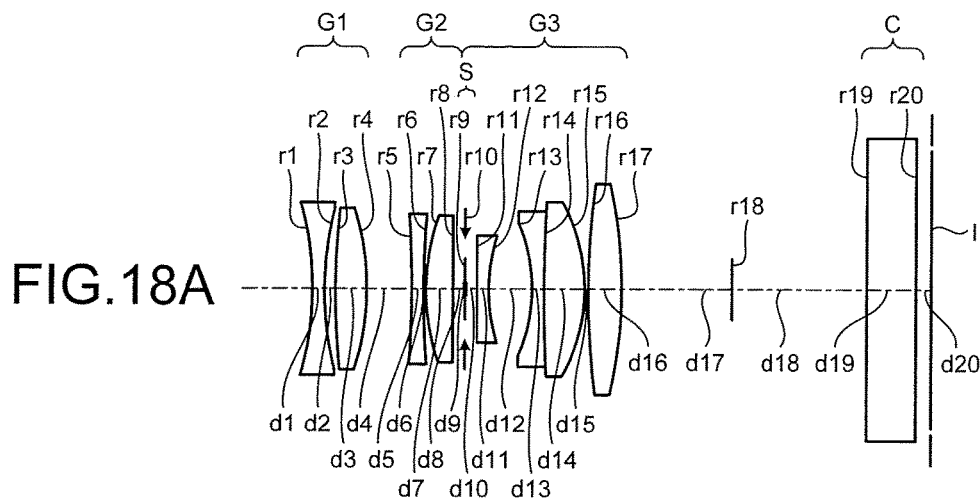
FIG. 18A is a diagram showing a cross-sectional configuration of the optical system in focusing on an object at a long distance when the optical system is set in mode 3-3.
Figure 18B:
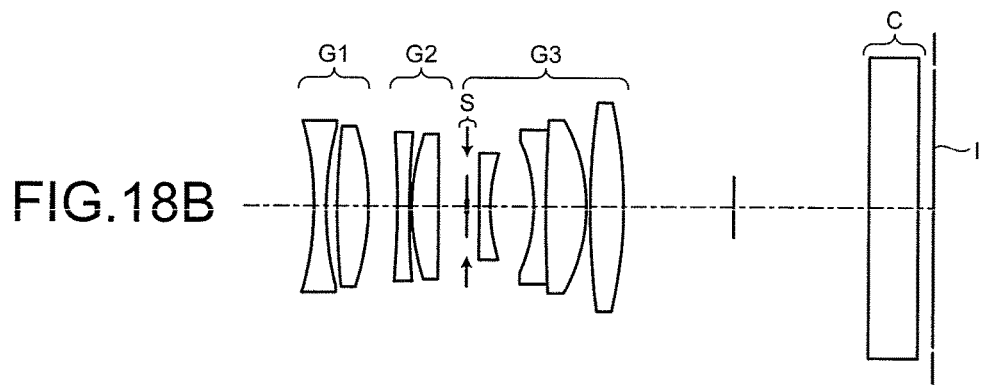
FIG. 18B shows a cross-sectional configuration of the optical system in a focusing state with a default state when the optical system is set in mode 3-3.
Figure 18C:
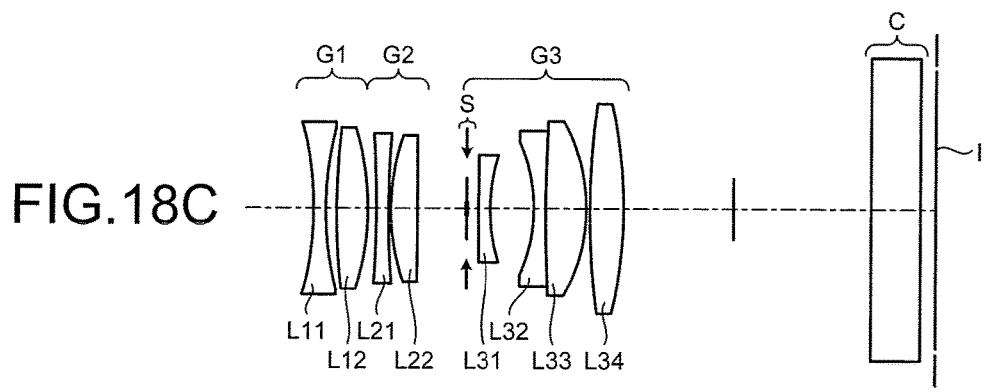
FIG. 18C is a diagram showing a cross-sectional configuration of the optical system in focusing on an object at a short distance when the optical system is set in mode 3-3.

FIGS. 18A to 18C are the sectional views showing examples of states of the mode 3-3. Specifically, FIG. 18A shows the cross-sectional configuration of the lens in focusing on an object at a long distance in mode 3-3. FIG. 18B shows the cross-sectional configuration of the lens in a focusing state with a default state in mode 3-3. FIG. 18C shows the cross-sectional configuration of the lens in focusing on an object at a short distance in mode 3-3. The focusing is performed the same as in the mode 3-1.

Numerical data for the variation will be shown below.

Mode 3-1:

TABLE 4

|  | Long distance | Default | Short distance |
|---|---|---|---|
| IH | 11.15 | 11.15 | 11.15 |
| Focal length | 24.97 | 25.00 | 25.35 |
| $F_{no.}$ | 2.86 | 2.86 | 2.86 |
| 2ω(°) | 49.20 | 48.71 | 43.94 |
| d4 | 3.75 | 3.49 | 1.00 |
| d8 | 1.00 | 1.26 | 3.75 |
| d9 | 0.13 | 0.13 | 0.13 |
| d18 | 10.22 | 10.22 | 10.22 |

Mode 3-2:

TABLE 5

|  | Long distance | Default | Short distance |
|---|---|---|---|
| IH | 11.15 | 11.15 | 11.15 |
| Focal length | 25.03 | 25.12 | 25.41 |
| $F_{no.}$ | 2.86 | 2.86 | 2.86 |
| 2ω(°) | 48.23 | 46.87 | 43.06 |
| d4 | 3.75 | 3.02 | 1.00 |
| d8 | 1.00 | 1.73 | 3.75 |
| d9 | 0.25 | 0.25 | 0.25 |
| d18 | 10.82 | 10.82 | 10.82 |

Mode 3-3:

TABLE 6

|  | Long distance | Default | Short distance |
|---|---|---|---|
| IH | 11.15 | 11.15 | 11.15 |
| Focal length | 25.08 | 25.29 | 25.47 |
| $F_{no.}$ | 2.86 | 2.86 | 2.86 |
| 2ω(°) | 47.28 | 44.52 | 42.20 |
| d4 | 3.75 | 2.24 | 1.00 |
| d8 | 1.00 | 2.51 | 3.75 |
| d9 | 0.38 | 0.38 | 0.38 |
| d18 | 11.41 | 11.41 | 11.41 |

Object-image distances and magnifications for the variation will be cited below.

Mode 3-1:

TABLE 7

|  | Longest | Default | Shortest |
|---|---|---|---|
| Object-image distance | 216.1417987 | 878.903759 | 647.9617966 |
| Magnification | −0.030363557 | −0.042284666 | −0.160069243 |

Mode 3-2:

TABLE 8

|  | Longest | Default | Shortest |
|---|---|---|---|
| Object-image distance | 470.1216975 | 323.9808983 | 192.0973976 |
| Magnification | −0.060618361 | −0.094304656 | −0.190155945 |

Mode 3-3:

TABLE 9

|  | Longest | Default | Shortest |
|---|---|---|---|
| Object-image distance | 334.330522 | 215.9872655 | 174.8724625 |
| Magnification | −0.090765389 | −0.160701685 | −0.220131699 |

In this variation, it is also possible to switch the modes using the mode switch 247 among the modes 1, 2, 3-1, 3-2 and 3-3.

A Second Variation of the Optical System

FIGS. 19A to 19D show configurations and operation outlines of another variation of the optical system (hereinafter referred to as "variation 2"). As shown in FIGS. 19A to 19D, the optical system according to this variation comprises, in order from the front side, a first lens group G11 having a positive refracting power with a diaphragm stop S and a second lens group G12 having a negative refracting power.

The first lens group G11 is made up of a positive meniscus lens L41 convexing to an object side, a negative meniscus lens L42 convexing to the object side, a diaphragm stop S', a cemented lens made up of a biconcave negative lens L43 and a biconvex positive lens L44 and a biconvex positive lens L45.

The second lens group G12 is made up of a negative meniscus lens L51 convexing to the object side. Aspheric surfaces are used on both sides of a biconvex positive lens L45 on the image surface I of the first lens group G11.

Figure 19:
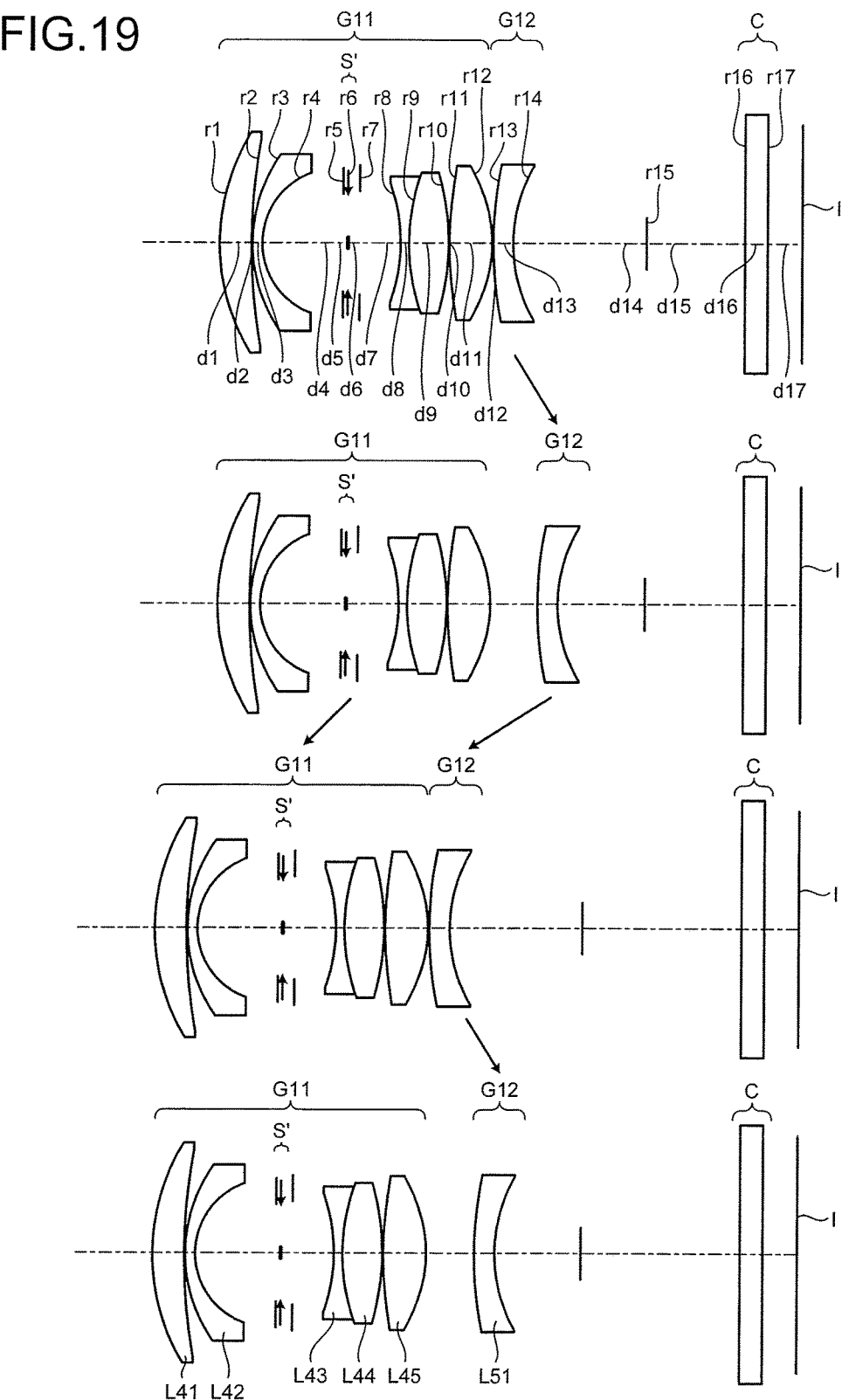
FIG. 19 is a sectional view showing examples of states of the optical system of another variation of the present invention.

In the mode 1, the second lens group G12 moves toward the rear side (the main body 2 side) in focusing on a first close object from an infinite object (from FIG. 19A to FIG. 19B). When the focusing is switched from the mode 1 to the mode 2, all lens groups move to the object side and then the optical system protrudes (from FIG. 19B to 19C).

In the mode 2, only the second lens group G2 moves toward the image surface I side in focusing on a third close object that is closer than the first close object from the second close object that is closer than the infinite object (from FIG. 19C to FIG. 19D).

It is noted that a moving system of the second lens group in mode changing may be optional as long as the second lens group is movable.

Accordingly, a lens group where the focusing lens group is positioned closest to the image in the optical system helps to reduce spherical aberration fluctuation by focusing.

Numerical data for variation 2 will be shown below.

2-1. Surface Data

TABLE 10

| Surface no. | r | d | nd | vd |
|---|---|---|---|---|
| Object plane | ∞ | ∞ | | |
| 1 | 20.357 | 3.10 | 1.88300 | 40.76 |
| 2 | 56.116 | 0.10 | | |
| 3 | 14.804 | 0.95 | 1.71300 | 53.87 |
| 4 | 7.197 | 7.87 | | |
| 5 | ∞ | 0.45 | | |
| 6(Stop) | ∞ | 1.15 | | |
| 7 | ∞ | 3.99 | | |
| 8 | −16.892 | 0.83 | 1.69895 | 30.13 |
| 9 | 19.669 | 3.86 | 1.77250 | 49.60 |
| 10 | −23.985 | 0.10 | | |
| 11* | 33.830 | 4.20 | 1.58313 | 59.38 |
| 12* | −12.588 | Variable | | |
| 13 | 36.891 | 2.00 | 1.51633 | 64.14 |
| 14 | 14.627 | Variable | | |
| 15 | ∞ | Variable | | |
| 16 | ∞ | 2.21 | 1.51633 | 64.14 |
| 17 | ∞ | 3.42 | | |
| Image surface (Image pickup surface) | ∞ | | | |

2-2. Aspherical Data
11th surface:
K=0.000,
$A_4$=−4.49818×10−5,
$A_6$=1.02178×10−9
12th surface:
K=−0.935,
$A_4$=2.10096×10$^{-5}$
$A_6$=−1.60991×10$^{-7}$ 2-3. Zoom Data

TABLE 11

| | Infinite distance | Close object 1 | Close object 2 | Close object 3 |
|---|---|---|---|---|
| IH | 11.15 | 11.15 | 11.15 | 11.15 |
| Focal length | 25.00 | 21.81 | 25.00 | 21.81 |
| $F_{no.}$ | 2.86 | 2.53 | 2.86 | 2.53 |
| 2ω(°) | 46.41 | 47.06 | 42.05 | 42.32 |
| d12 | 0.10 | 4.68 | 0.10 | 4.68 |
| d14 | 13.05 | 8.47 | 13.05 | 8.47 |
| d15 | 9.63 | 9.63 | 15.52 | 15.52 |

2-4. Lens Unit Focal Length
f1=16.13, f2=−48.42
It is more preferred that the conditional expressions (1) to (6) be satisfied in variation 2.

TABLE 12

| Object-image distance | | |
|---|---|---|
| | Close object 1 | 151.8574881 |
| | Close object 2 | 170.1538021 |
| | Close object 3 | 106.5408394 |
| Magnification | | |
| | Close object 1 | −0.23 |
| | Close object 2 | −0.235509551 |
| | Close object 3 | −0.50 |
| dB/dA | | 14.3547705 |
| \| fA/ΔA1 \| | | 10.58649013 |
| \| fA/ΔA2 \| | | 10.58649013 |
| \| fA/f \| | | 1.936613381 |
| f3/f | | — |
| \| (D1G − D2G)/D1G \| | | — |

Additional advantages and modifications will readily occur to those skilled in the art. Therefore, the invention in its broader aspects is not so limited to the specific details and representative embodiments shown and described herein. Accordingly, various modifications may be made without departing from the spirit or scope of the general inventive concept as defined by the appended claims and their equivalents.

What is claimed is:

1. An optical system having at least a first mode that focuses within a range of focus from an infinite object to a first close object and a second mode that focuses within a range of focus from a second close object to a third close object, the second close object being closer to an imaging apparatus than the infinite object, the third close object being closer to the imaging apparatus than the first close object, the optical system comprising:
   a focus lens group that is made up of one or two lenses and moves in an optical axis direction in focusing in each of the first mode and the second mode; and
   one or more mode change lens groups that move in the optical axis direction separately from the focus lens group when the focusing is changed from the first mode to the second mode, wherein 6<*dB/dA*<50 is satisfied, where dA is a distance on the optical axis between an incoming plane and an outgoing plane of the focus lens group, and dB is a distance on the optical axis between an incoming plane closest to an object side among incoming planes of all lens groups that move when the focusing is changed from the first mode to the second mode and an outgoing plane closest to an image side among outgoing planes of the all lens groups, dB being a maximum distance if the distance is variable.

2. The optical system according to claim 1, wherein the focus lens group is made up of an only lens group that moves in the optical axis direction in focusing in each of the first mode and the second mode.

3. The optical system according to claim 1, wherein
one of the one or more mode change lens groups is positioned immediately before the focus lens group with respect to the object side, and
a range of movement of the focus lens group in the optical axis direction in the second mode is shifted to be closer to the object side than in the first mode.

4. The optical system according to claim 1, wherein a lens group closest to the object side among the lens groups included in the optical system is one of the one or more mode change lens groups.

5. The optical system according to the claim 1, wherein the one or more mode change lens groups include a first mode change lens group and a second mode change lens group.

6. The optical system according to claim 5, wherein a relative distance between the first mode change lens group and the second mode change group changes when the focusing is changed from the first mode to the second mode.

7. The optical system according to claim 1, wherein the one or more mode change lens groups are fixed and the focus lens group is moved in the optical axis direction upon focusing in any state during change from the first mode to the second mode.

8. The optical system according to claim 1, wherein the focus lens group satisfies $$2<|fA/\Delta A1|<35, \text{ and}$$

$$2<|fA/\Delta A2|<35,$$

where $\Delta A1$ is a range of movement of the focus lens group in the optical axis direction in the first mode, $\Delta A2$ is a range of movement of the focus lens group in the optical axis direction in the second mode, and fA is a focal length of the focus lens group.

9. The optical system according to claim 1, wherein wobbling in the optical axis direction is performed on the focus lens group while the focus lens group moves to focus.

10. The optical system according to claim 1, wherein the one or more mode change lens groups in the first mode move to an image surface side and thus are retracted.

11. The optical system according to claim 1, wherein
the optical system includes a first lens group, a second lens group, and a third lens group that are arranged in order from a subject side to an image side,
the first lens group and the third lens group are the mode change lens groups,
the second lens group is the focus lens group, and the first, second, and third lens groups moves to the subject side with respect to an image surface when the focusing is changed from the first mode to the second mode.

12. The optical system according to the claim 11, wherein the third lens group satisfies $$1<f3/f<5,$$

where f3 is a focal length of the third lens group and f is a focal length of the optical system upon focusing on the infinite object in the first mode.

13. The optical system according to claim 11, wherein the focus lens group satisfies $$0.5<|fA/f|<10,$$

where fA is a focal length of the focus lens group, and f is a focal length of the optical system upon focusing on the infinite object in the first mode.

14. The optical system according to claim 1, wherein
the one or more mode change lens groups are made up of a first mode change lens group closer to the object side and a second mode change lens group closer to the image side, and $$0.00<|(D1G-D2G)/D1G|<1.00$$

is satisfied,
where D1G is a moving distance of the first mode change lens group toward the object side when the focusing is changed from the first mode to the second mode, and D2G is a moving distance of the second mode change lens group toward the object side when the focusing is changed from the first mode to the second mode.

15. An imaging apparatus comprising:
the optical system according to the claim 1; and
a main body that is provided with the optical system to capture an image.

16. A lens control system for an imaging apparatus comprising:
a plurality of lens groups including a focus lens group and at least one mode change lens group;
a lens controller that moves the lens groups between a first mode and a second mode when focusing, the lens controller moves the focus lens group in an optical axis direction when focusing in both the first mode and second mode, and the lens controller moves the at least one mode change lens group in the optical axis direction separately from the focus lens group when the focusing is changed from the first mode to the second mode; and
a first lens group, a second lens group, and a third lens group arranged in order from a subject side to an image side, wherein
each lens group contains at least one lens, and
the first lens group and the third lens group are the mode change lens groups, and the second lens group is the focus lens group.

17. The lens control system according claim 16, wherein at least one of the lens groups is independently movable with respect to the other lens groups.

18. The lens control system according to the claim 16, wherein the first, second, and third lens groups move to the subject side with respect to an image surface when focusing is changed from the first mode to the second mode.

19. The lens control system according to claim 16, wherein
the first mode is a mode that focuses within a range of focus from an infinite object to a first close object, and
the second mode is a mode that focuses within a range of focus from a second close object to a third close object, the second close object being closer to the imaging apparatus than the infinite object, the third close object being closer to the imaging apparatus than the first close object.

20. The lens control system according to claim 16, wherein the focus lens group is made up of one or two lenses.

21. An optical system having at least a first mode that focuses within a range of focus from an infinite object to a first close object and a second mode that focuses within a range of focus from a second close object to a third close object, the second close object being closer to an imaging apparatus than the infinite object, the third close object being closer to the imaging apparatus than the first close object, the optical system comprising:
- a focus lens group that moves in an optical axis direction in focusing in each of the first mode and the second mode;
- one or more mode change lens groups that move in the optical axis direction separately from the focus lens group when the focusing is changed from the first mode to the second mode, and
- a first lens group, a second lens group, and a third lens group arranged in order from a subject side to an image side, wherein
- wobbling in the optical axis direction is performed on the focus lens group while the focus lens group moves to focus,
- each lens group contains at least one lens, and
- the first lens group and the third lens group are the mode change lens groups, and the second lens group is the focus lens group.

22. An optical system having at least a first mode that focuses within a range of focus from an infinite object to a first close object and a second mode that focuses within a range of focus from a second close object to a third close object, the second close object being closer to an imaging apparatus than the infinite object, the third close object being closer to the imaging apparatus than the first close object, the optical system comprising:
- a focus lens group that moves in an optical axis direction in focusing in each of the first mode and the second mode;
- one or more mode change lens groups that move in the optical axis direction separately from the focus lens group when the focusing is changed from the first mode to the second mode, and
- a first lens group, a second lens group, and a third lens group arranged in order from a subject side to an image side, wherein
- the one or more mode change lens groups in the first mode move to an image surface side and thus are retracted,
- each lens group contains at least one lens, and
- the first lens group and the third lens group are the mode change lens groups, and the second lens group is the focus lens group.

* * * * *